(12) United States Patent
Le et al.

(10) Patent No.: US 12,587,679 B2
(45) Date of Patent: Mar. 24, 2026

(54) LOW-LATENCY MACHINE LEARNING-BASED STEREO STREAMING

(71) Applicant: QUALCOMM Incorporated, San Diego, CA (US)

(72) Inventors: Hoang Cong Minh Le, Santee, CA (US); Qiqi Hou, San Diego, CA (US); Farzad Farhadzadeh, San Diego, CA (US); Amir Said, San Diego, CA (US); Auke Joris Wiggers, Amsterdam (NL); Guillaume Konrad Sautiere, Amsterdam (NL); Reza Pourreza, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/636,126

(22) Filed: Apr. 15, 2024

(65) Prior Publication Data

US 2024/0364925 A1     Oct. 31, 2024

Related U.S. Application Data

(60) Provisional application No. 63/498,497, filed on Apr. 26, 2023.

(51) Int. Cl.
| | |
|---|---|
| *H04N 19/597* | (2014.01) |
| *H04N 19/137* | (2014.01) |
| *H04N 19/436* | (2014.01) |

(52) U.S. Cl.
CPC ......... *H04N 19/597* (2014.11); *H04N 19/137* (2014.11); *H04N 19/436* (2014.11)

(58) Field of Classification Search
CPC ..... H04N 19/597; H04N 19/137; H04N 19/43
See application file for complete search history.

(56) References Cited

U.S. PATENT DOCUMENTS

| | | | |
|---|---|---|---|
| 2013/0335522 A1* | 12/2013 | Zhang | H04N 19/597 |
| | | | 348/43 |
| 2021/0195206 A1* | 6/2021 | Hannuksela | H04N 19/149 |
| 2021/0286068 A1* | 9/2021 | Kumar | G01S 13/87 |
| 2024/0354997 A1* | 10/2024 | Dinev | G06T 9/00 |

FOREIGN PATENT DOCUMENTS

CN          107392868 A   *  11/2017

* cited by examiner

*Primary Examiner* — Jae N Noh
(74) *Attorney, Agent, or Firm* — Polsinelli

(57) ABSTRACT

Systems and techniques are described herein for processing video data. For example, a machine-learning based stereo video coding system can obtain video data including at least a right-view image of a right view of a scene and a left-view image of a left view of the scene. The machine-learning based stereo video coding system can compress the right-view image and the left-view image in parallel to generate a latent representation of the right-view image and the left-view image. The right-view image and the left-view image can be compressed in parallel based on inter-view information between the right-view image and the left-view image, determined using one or more parallel autoencoders.

20 Claims, 15 Drawing Sheets

800

Obtain video data comprising a temporal series of a plurality of images, the video data including at least a right-view image of a right view of a scene and a left-view image of a left view of the scene
802

Compress the right-view image and the left-view image in parallel to generate a latent representation of the right-view image and the left-view image, wherein the right-view image and the left-view image are compressed in parallel based on inter-view information between the right-view image and the left-view image determined using one or more parallel autoencoders
804

Obtain a first reconstructed right-view image of a right view of a scene at a first time step and a first reconstructed left-view image of a left view of the scene at the first time step
852

Obtain encoded motion information associated with a compressed right-view image and a compressed left-view image
854

Decode the encoded motion information to generate reconstructed motion information
856

Warp, using the reconstructed motion information, the first reconstructed right-view image and the first reconstructed left-view image to generate a second reconstructed right-view image of a right view of the scene at a second time step and a second reconstructed left-view image of a left view of the scene at the second time step
858

FIG. 8B

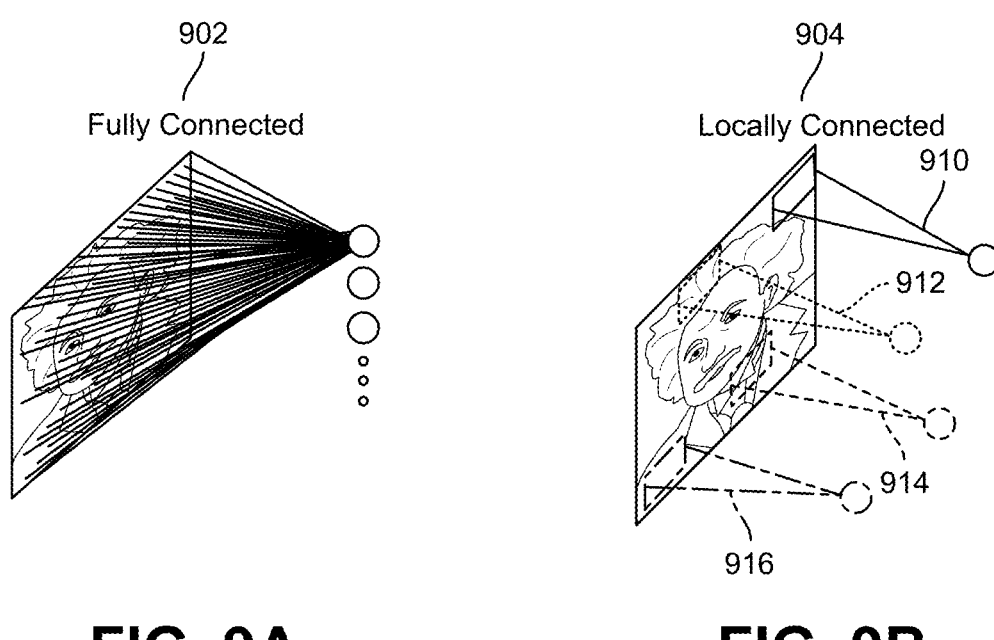
FIG. 9A
FIG. 9B
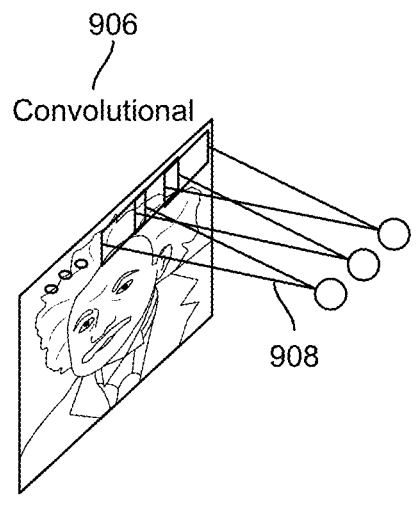
FIG. 9C

LOW-LATENCY MACHINE LEARNING-BASED STEREO STREAMING

CROSS REFERENCE TO RELATED APPLICATIONS

This application claims the benefit of U.S. Provisional Patent Application No. 63/498,497, filed Apr. 26, 2023, which is hereby incorporated by reference, in its entirety and for all purposes.

FIELD

The present disclosure generally relates to image and video coding, including encoding (or compression) and decoding (decompression) (referred to herein collectively as "coding") of images and/or video. For example, aspects of the present disclosure relate to systems and techniques for providing low-latency machine learning (e.g., neural network)-based stereo streaming.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

According to at least one illustrative example, an apparatus for encoding video data is provided. The apparatus includes at least one memory and at least one processor coupled to the at least one memory and configured to: obtain video data comprising a temporal series of a plurality of images, the video data including at least a right-view image of a right view of a scene and a left-view image of a left view of the scene; and compress the right-view image and the left-view image in parallel to generate a latent representation of the right-view image and the left-view image, wherein the right-view image and the left-view image are compressed in parallel based on inter-view information between the right-view image and the left-view image determined using one or more parallel autoencoders.

In another example, a method for encoding video data is provided. The method includes: obtaining video data comprising a temporal series of a plurality of images, the video data including at least a right-view image of a right view of a scene and a left-view image of a left view of the scene; and compressing the right-view image and the left-view image in parallel to generate a latent representation of the right-view image and the left-view image, wherein the right-view image and the left-view image are compressed in parallel based on inter-view information between the right-view image and the left-view image determined using one or more parallel autoencoders.

In another example, a non-transitory computer-readable medium is provided that includes instructions that, when executed by at least one processor, cause the at least one processor to: obtain video data comprising a temporal series of a plurality of images, the video data including at least a right-view image of a right view of a scene and a left-view image of a left view of the scene; and compress the right-view image and the left-view image in parallel to generate a latent representation of the right-view image and the left-view image, wherein the right-view image and the left-view image are compressed in parallel based on inter-view information between the right-view image and the left-view image determined using one or more parallel autoencoders.

In another example, an apparatus for encoding video data is provided. The apparatus includes: means for obtaining video data comprising a temporal series of a plurality of images, the video data including at least a right-view image of a right view of a scene and a left-view image of a left view of the scene; and means for compressing the right-view image and the left-view image in parallel to generate a latent representation of the right-view image and the left-view image, wherein the right-view image and the left-view image are compressed in parallel based on inter-view information between the right-view image and the left-view image determined using one or more parallel autoencoders.

In another illustrative example, an apparatus for decoding video data is provided. The apparatus includes at least one memory and at least one processor coupled to the at least one memory and configured to: obtain a first reconstructed right-view image of a right view of a scene at a first time step and a first reconstructed left-view image of a left view of the scene at the first time step; obtain encoded motion information associated with a compressed right-view image and a compressed left-view image; decode the encoded motion information to generate reconstructed motion information; and warp, using the reconstructed motion information, the first reconstructed right-view image and the first reconstructed left-view image to generate a second reconstructed right-view image of a right view of the scene at a second time step and a second reconstructed left-view image of a left view of the scene at the second time step.

In another example, a method for decoding video data is provided. The method includes: obtaining a first reconstructed right-view image of a right view of a scene at a first time step and a first reconstructed left-view image of a left view of the scene at the first time step; obtaining encoded motion information associated with a compressed right-view image and a compressed left-view image; decoding the encoded motion information to generate reconstructed motion information; and warping, using the reconstructed motion information, the first reconstructed right-view image and the first reconstructed left-view image to generate a second reconstructed right-view image of a right view of the scene at a second time step and a second reconstructed left-view image of a left view of the scene at the second time step.

In another example, a non-transitory computer-readable medium is provided that includes instructions that, when executed by at least one processor, cause the at least one processor to: obtain a first reconstructed right-view image of a right view of a scene at a first time step and a first reconstructed left-view image of a left view of the scene at the first time step; obtain encoded motion information associated with a compressed right-view image and a compressed left-view image; decode the encoded motion information to generate reconstructed motion information; and warp, using the reconstructed motion information, the first reconstructed right-view image and the first reconstructed left-view image to generate a second reconstructed right-view image of a right view of the scene at a second time step and a second reconstructed left-view image of a left view of the scene at the second time step.

In another example, an apparatus for decoding video data is provided. The apparatus includes: means for obtaining a first reconstructed right-view image of a right view of a scene at a first time step and a first reconstructed left-view image of a left view of the scene at the first time step; means for obtaining encoded motion information associated with a compressed right-view image and a compressed left-view image; means for decoding the encoded motion information to generate reconstructed motion information; and means for warping, using the reconstructed motion information, the first reconstructed right-view image and the first reconstructed left-view image to generate a second reconstructed right-view image of a right view of the scene at a second time step and a second reconstructed left-view image of a left view of the scene at the second time step.

In some aspects, one or more of the apparatuses described herein is, is part of, or includes a mobile device (e.g., a mobile telephone or so-called "smart phone", a tablet computer, or other type of mobile device), a wearable device, an extended reality (XR) device (e.g., a virtual reality (VR) device, an augmented reality (AR) device, or a mixed reality (MR) device), a vehicle (or a computing device of a vehicle), a personal computer, a laptop computer, a video server, a television (e.g., a network-connected television), or other device. In some aspects, the apparatus includes at least one camera for capturing one or more images or video frames. For example, the apparatus(es) can include a camera (e.g., a red-green-blue (RGB) camera) or multiple cameras for capturing one or more images and/or one or more videos including video frames. In some aspects, the apparatus(es) includes a display for displaying one or more images, videos, notifications, or other displayable data. In some aspects, the apparatus(es) includes at least one transmitter (or at least one transceiver) configured to transmit one or more video frame and/or syntax data over a transmission medium to at least one device. In some aspects, the at least one processor of the apparatus noted above includes a neural processing unit (NPU), a central processing unit (CPU), a digital signal processor (DSP), a graphics processing unit (GPU), or other processing device or component.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8A is a flow chart diagram illustrating an example of a process for encoding video data, in accordance with some examples;

FIG. 8B is a flowchart diagram illustrating an example of a process for decoding video data, in accordance with some examples;

FIG. 9A illustrates an example of a fully connected neural network, in accordance with some examples;

FIG. 9B illustrates an example of a locally connected neural network, in accordance with some examples;

FIG. 9C illustrates an example of a convolutional neural network, in accordance with some examples;

DETAILED DESCRIPTION

Figure 1:
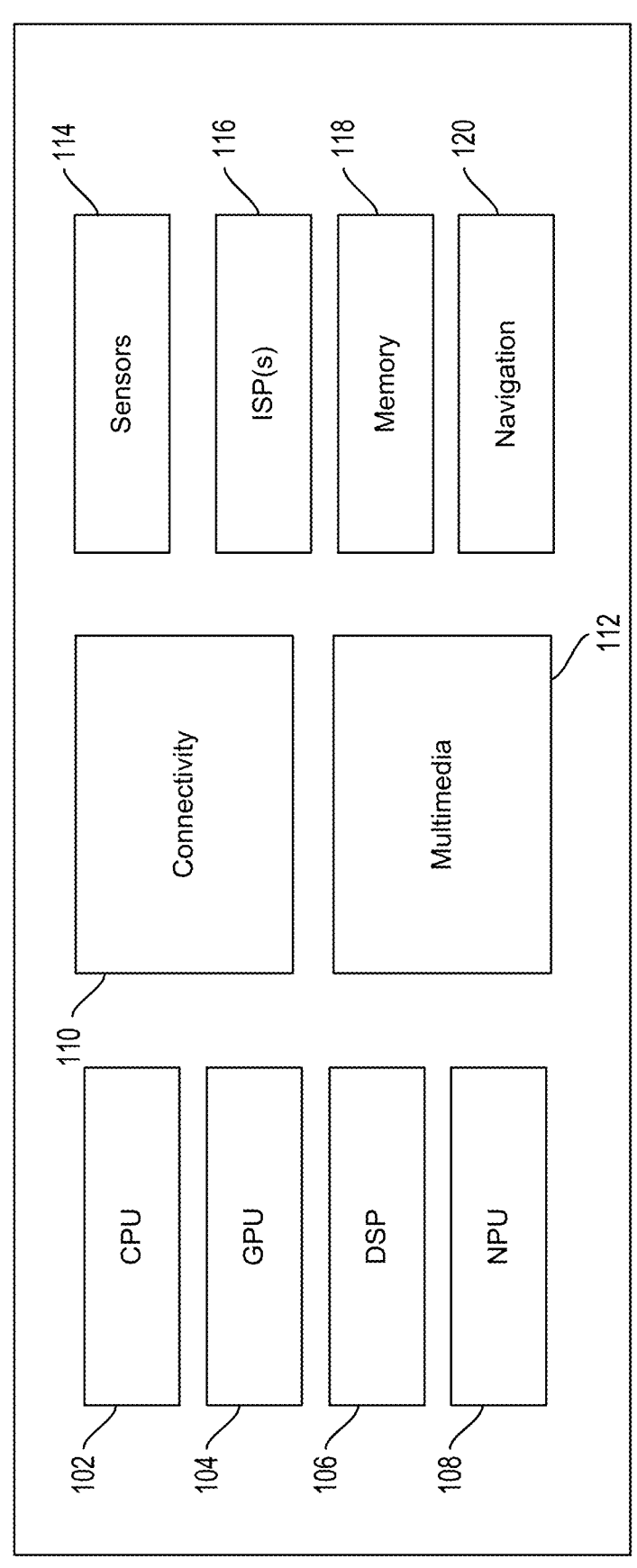
FIG. 1 illustrates an example implementation of a system-on-a-chip (SOC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding Standard or can be performed using one or more machine learning systems or algorithms. Example video coding Standards include versatile video coding (VVC), high-efficiency video coding (HEVC), advanced video coding (AVC), moving picture experts group (MPEG) coding (e.g., MPEG-5 Essential Video Coding (EVC) or other MPEG-based coding), AOMedia Video 1 (AV1), among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

There are many recent technologies that have led to an increase in demand for stereo (e.g., with left and right views of a scene) and multi-view video streaming, such as in extended reality (XR) (e.g., virtual reality (VR), augmented reality (AR), and mixed reality (MR)) systems or applications, vehicle systems or applications (e.g., for autonomous vehicles), robotics systems or applications, etc. Such an increase in demand poses new challenges for existing video coding/compression methods, which were mostly optimized for single view videos. It is important for a stereo video encoder-decoder (or codec) to exploit both same view temporal redundancy and cross-view spatial redundancy to optimize for efficiency (e.g., rate-distortion efficiency). It is also important that such a stereo video codec can operate at the lowest latency to adapt instantly to user interaction (e.g., in an XR headset when a user changes head position, causing a view of a virtual or augmented environment to change).

As described in more detail below, systems, apparatuses, methods (also referred to as processes), and computer-readable media (collectively referred to as "systems and techniques") are described herein for providing low-latency machine learning (e.g., neural network)-based stereo streaming. According to aspects described herein, the systems and techniques can use a machine learning-based video coder-decoder (also referred to as a "codec"), such as a neural network-based video codec, to enhance the performance of stereo video compression. The systems and techniques provide a design for a machine learning (e.g., neural network)-based codec that optimizes for both low-latency and rate-distortion performance. The machine learning (e.g., neural network)-based codec can be designed for low-latency stereo video compression, whereas existing techniques are not designed for low-latency.

In some cases, the systems and techniques described herein can leverage at least two different schemes to model the redundancy in stereo video, including explicit motion compensation and conditional coding to address temporal redundancy and conditional distribution encoding to address cross-view redundancy. Based on such a design, the coding (or compression) of left and right views can run in parallel to minimize latency instead of relying on sequential cross-view coding.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using Standards-based video coding and/or using machine learning techniques. Examples of Standards-based and machine learning-based video coding systems are described with respect to FIG. 2 and FIG. 3.

Figure 2:
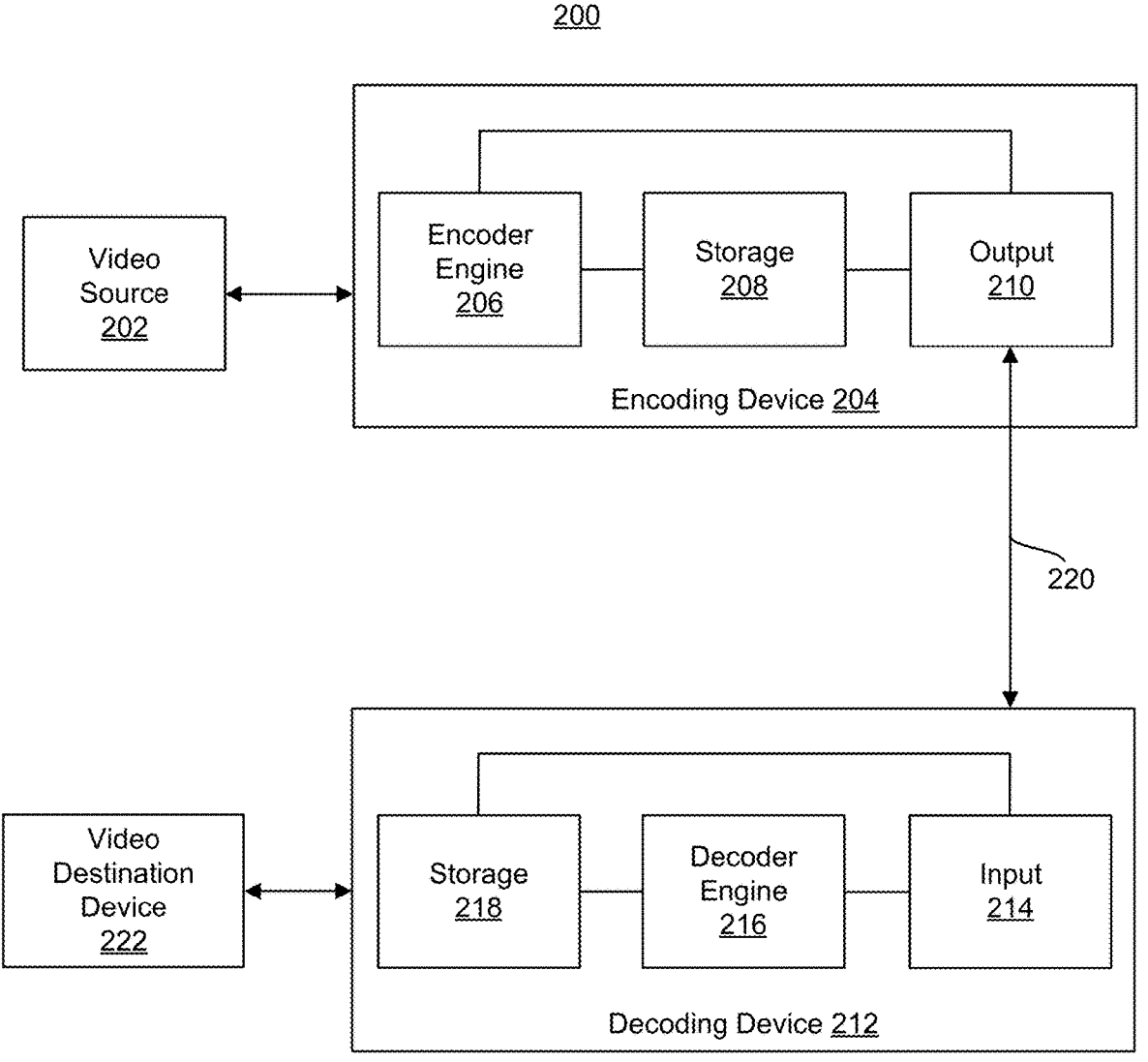
FIG. 2 is a block diagram illustrating an encoding device and a decoding device, in accordance with some examples.

FIG. 2 is a block diagram illustrating an example of a system 200 including an encoding device 204 and a decoding device 212 that can respectively encode and decode video data accordance with examples described herein. In some examples, the encoding device 204 and/or the decoding device 212 can include the SOC 100 of FIG. 1. The encoding device 204 may be part of a source device, and the decoding device 212 may be part of a receiving device (also referred to as a client device). In some examples, the source device can also include a decoding device similar to the decoding device 212. In some examples, the receiving device can also include an encoding device similar to the encoding device 204. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 200 can include and/or can be implemented using electronic circuits or other electronic hardware, which can include the SOC 100 and/or one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

While the system 200 is shown to include certain components, one of ordinary skill will appreciate that the system 200 can include more or fewer components than those shown in FIG. 2. For example, the system 200 can also include, in some instances, one or more memory devices other than the storage 208 and the storage 218 (e.g., one or more random access memory (RAM) components, read-only memory (ROM) components, cache memory components, buffer components, database components, and/or other memory devices), one or more processing devices (e.g., one or more CPUs, GPUs, NPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 200 can support one-way or two-way video transmission to support applications such as video conferencing, video streaming, video playback, video broadcasting, gaming, and/or video telephony.

In some examples, the encoding device 204 (or encoder) can be used to encode video data using a video coding Standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, Versatile Video Coding (VVC) or ITU-T H.266, and/or other video coding Standards. One or more of the video coding Standards have extensions associated with other aspects of video coding.

For instance, various extensions to HEVC deal with multi-layer video coding, including the range and screen content coding extensions, 3D video coding (3D-HEVC) and multiview extensions (MV-HEVC) and scalable extension (SHVC).

Many aspects described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed, such as the machine learning based video coding described below. Accordingly, while the techniques and systems described herein may be described with reference to a particular video coding standard, one of ordinary skill in the art will appreciate that the description should not be interpreted to apply only to that particular standard.

Referring to FIG. 2, a video source 202 may provide the video data to the encoding device 204. The video source 202 may be part of the source device, or may be part of a device other than the source device. The video source 202 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 202 may include one or more input pictures. Pictures may also be referred to as "frames." A picture or frame is a still image that, in some cases, is part of a video. In some examples, data from the video source 202 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 206 (or encoder) of the encoding device 204 encodes the video data to generate an encoded video bitstream. In some examples, an encoded video bitstream (or "video bitstream" or "bitstream") is a series of one or more coded video sequences. According to HEVC, a coded video sequence (CVS) includes a series of access units (AUs) starting with an AU that has a random access point picture in the base layer and with certain properties (e.g., a RASL flag (e.g., NoRaslOutputFlag) equal to 1) up to and not including a next AU that has a random access point picture in the base layer and with certain properties. An AU includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 212 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 206 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some aspects, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to HEVC, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 206.

Once the pictures of the video data are partitioned into CUs, the encoder engine 206 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

As noted above, in some cases the encoder engine 206 and decoder engine 216 (described in more detail below) may be configured to operate according to VVC. According to VVC, a video coder (such as encoder engine 206 and/or decoder engine 216) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of the disclosure may also be applied to video coders configured to use quadtree partitioning, or other types of partitioning as well.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

| Specification of intra prediction mode and associated names | |
| --- | --- |
| Intra-prediction mode | Associated name |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, 1%-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$,refIdx$_0$ and $\Delta x_1$, $y_1$,refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$,refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 204 can perform transformation and quantization. For example, following prediction, the encoder engine 206 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 206 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 206. A given CU having one or more PUs may also include one or more TUs. As described in further detail below, the residual values may be transformed into transform coefficients using the block transforms, and may be quantized and scanned using TUs to produce serialized transform coefficients for entropy coding.

In some aspects following intra-predictive or inter-predictive coding using PUs of a CU, the encoder engine 206 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 206 may form one or more TUs including the residual data for a CU (which includes the PUs), and may transform the TUs to produce transform coefficients for the CU. The TUs may comprise coefficients in the transform domain following application of a block transform.

The encoder engine 206 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 206. In some examples, the encoder engine 206 may utilize a predefined scan order to scan the quantized transform coefficients to produce a serialized vector that can be entropy encoded. In some examples, encoder engine 206 may perform an adaptive scan. After scanning the quantized transform coefficients to form a vector (e.g., a one-dimensional vector), the encoder engine 206 may entropy encode the vector. For example, the encoder engine 206 may use context adaptive variable length coding, context adaptive binary arithmetic coding, syntax-based context-adaptive binary arithmetic coding, probability interval partitioning entropy coding, or another suitable entropy encoding technique.

The output 210 of the encoding device 204 may send the NAL units making up the encoded video bitstream data over the communications link 220 to the decoding device 212 of the receiving device. The input 214 of the decoding device 212 may receive the NAL units. The communications link 220 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 204 may store encoded video bitstream data in storage 208. The output 210 may retrieve the encoded video bitstream data from the encoder engine 206 or from the storage 208. Storage 208 may include any of a variety of distributed or locally accessed data storage media. For example, the storage 208 may include a hard drive, a storage disc, flash memory, volatile or non-volatile memory, or any other suitable digital storage media for storing encoded video data. The storage 208 can also include a decoded picture buffer (DPB) for storing reference pictures for use in inter-prediction. In a further example, the storage 208 can correspond to a file server or another intermediate storage device that may store the encoded video generated by the source device. In such cases, the receiving device including the decoding device 212 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. The access may include a wireless channel (e.g., a Wi-Fi connection), a wired connection (e.g., DSL, cable modem, etc.), or a combination of both that is suitable for accessing encoded video data stored on a file server. The transmission of encoded video data from the storage 208 may be a streaming transmission, a download transmission, or a combination thereof.

The input 214 of the decoding device 212 receives the encoded video bitstream data and may provide the video bitstream data to the decoder engine 216, or to storage 218 for later use by the decoder engine 216. For example, the storage 218 can include a DPB for storing reference pictures for use in inter-prediction. The receiving device including the decoding device 212 can receive the encoded video data to be decoded via the storage 208. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 216 may decode the encoded video bitstream data by entropy decoding (e.g., using an entropy decoder) and extracting the elements of one or more coded video sequences making up the encoded video data. The decoder engine 216 may rescale and perform an inverse transform on the encoded video bitstream data. Residual data is passed to a prediction stage of the decoder engine 216. The decoder engine 216 predicts a block of pixels (e.g., a PU). In some examples, the prediction is added to the output of the inverse transform (the residual data).

The video decoding device 212 may output the decoded video to a video destination device 222, which may include a display or other output device for displaying the decoded video data to a consumer of the content. In some aspects, the video destination device 222 may be part of the receiving device that includes the decoding device 212. In some aspects, the video destination device 222 may be part of a separate device other than the receiving device.

In some aspects, the video encoding device 204 and/or the video decoding device 212 may be integrated with an audio encoding device and audio decoding device, respectively. The video encoding device 204 and/or the video decoding device 212 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 204 and the video decoding device 212 may be integrated as part of a combined encoder/decoder (codec) in a respective device.

The example system shown in FIG. 2 is one illustrative example that can be used herein. Techniques for processing video data using the techniques described herein can be performed by any digital video encoding and/or decoding device. Although generally the techniques of the disclosure are performed by a video encoding device or a video decoding device, the techniques may also be performed by a combined video encoder-decoder, typically referred to as a "CODEC." Moreover, the techniques of the disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

As noted above, in some examples, the SOC 100 and/or components thereof may be configured to perform video compression and/or decompression (also referred to as video encoding and/or decoding, collectively referred to as video coding) using machine learning techniques. For instance, the encoding device 204 (or encoder) can be used to encode video data using a machine learning system with a deep learning architecture (e.g., by utilizing the NPU 108 of the SOC 100 of FIG. 1). In some cases, using deep learning architectures to perform video compression and/or decompression can increase the efficiency of video compression and/or decompression on a device. For example, the encoding device 204 can use a machine learning based video coding technique to compress video more efficiently, can transmit the compressed video to the decoding device 212, and the decoding device 212 can decompress the compressed video using the machine learning based techniques.

A neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 9A-FIG. 10.

Figure 3:
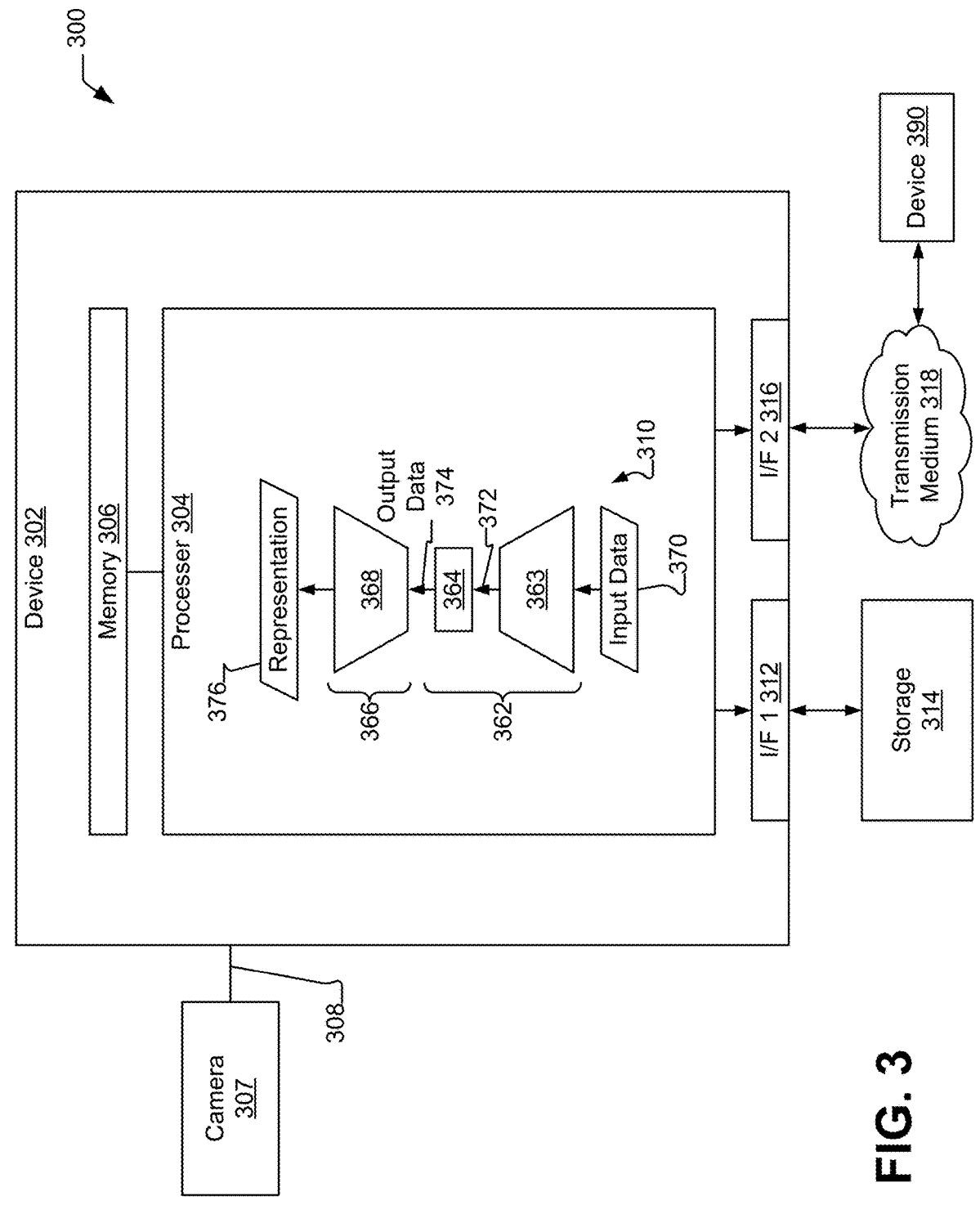
FIG. 3 is a diagram illustrating an example of a system including a device operable to perform image and/or video coding (encoding and decoding) using a neural network-based system, in accordance with some examples.

FIG. 3 depicts a system 300 that includes a device 302 configured to perform video encoding and decoding using a machine learning coding system 310. The device 302 is coupled to a camera 307 and a storage medium 314 (e.g., a data storage device). In some implementations, the camera 307 is configured to provide the image data 308 (e.g., a video data stream) to the processor 304 for encoding by the machine learning coding system 310. In some implementations, the device 302 can be coupled to and/or can include multiple cameras (e.g., a dual-camera system, three cameras, or other number of cameras). In some cases, the device 302 can be coupled to a microphone and/or other input device (e.g., a keyboard, a mouse, a touch input device such as a touchscreen and/or touchpad, and/or other input device). In some examples, the camera 307, the storage medium 314, microphone, and/or other input device can be part of the device 302.

The device 302 is also coupled to a second device 390 via a transmission medium 318, such as one or more wireless networks, one or more wired networks, or a combination thereof. For example, the transmission medium 318 can include a channel provided by a wireless network, a wired network, or a combination of a wired and wireless network. The transmission medium 318 may form part of a packet-based network, such as a local area network, a wide-area network, or a global network such as the Internet. The transmission medium 318 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 302 includes one or more processors (referred to herein as "processor") 304 coupled to a memory 306, a first interface ("I/F 1") 312, and a second interface ("I/F 2") 316. The processor 304 is configured to receive image data 308 from the camera 307, from the memory 306, and/or from the storage medium 314. The processor 304 is coupled to the storage medium 314 via the first interface 312 (e.g., via a memory bus) and is coupled to the transmission medium 318 via the second interface 316 (e.g., a network interface device, a wireless transceiver and antenna, one or more other network interface devices, or a combination thereof).

The processor 304 includes the machine learning coding system 310. The machine learning coding system 310 includes an encoder portion 362 and a decoder portion 366. In some implementations, the machine learning coding system 310 can include one or more auto-encoders. The encoder portion 362 is configured to receive input data 370 and to process the input data 370 to generate output data 374 at least partially based on the input data 370.

In some implementations, the encoder portion 362 of the machine learning coding system 310 is configured to perform lossy compression of the input data 370 to generate the output data 374, so that the output data 374 has fewer bits than the input data 370. The encoder portion 362 can be trained to compress input data 370 (e.g., images or video frames) without using motion compensation based on any previous representations (e.g., one or more previously reconstructed frames). For example, the encoder portion 362 can compress a video frame using video data only from that video frame, and without using any data of previously reconstructed frames. Video frames processed by the encoder portion 362 can be referred to herein as intra-predicted frame (I-frames). In some examples, I-frames can be generated using traditional video coding techniques (e.g., according to HEVC, VVC, MPEG-4, or other video coding Standard). In such examples, the processor 304 may include or be coupled with a video coding device (e.g., an encoding device) configured to perform block-based intra-prediction, such as that described above with respect to the HEVC Standard. In such examples, the machine learning coding system 310 may be excluded from the processor 304.

In some implementations, the encoder portion 362 of the machine learning coding system 310 can be trained to compress input data 370 (e.g., video frames) using motion compensation based on previous representations (e.g., one or more previously reconstructed frames). For example, the encoder portion 362 can compress a video frame using video data from that video frame and using data of previously reconstructed frames. Video frames processed by the encoder portion 362 can be referred to herein as intra-predicted frame (P-frames). The motion compensation can be used to determine the data of a current frame by describing how the pixels from a previously reconstructed frame move into new positions in the current frame along with residual information.

As shown, the encoder portion 362 of the machine learning coding system 310 can include a neural network 363 and a quantizer 364. The neural network 363 can include one or more convolutional neural networks (CNNs), one or more fully-connected neural networks, one or more gated recurrent units (GRUs), one or more Long short-term memory (LSTM) networks, one or more ConvRNNs, one or more ConvGRUs, one or more ConvLSTMs, one or more GANs, any combination thereof, and/or other types of neural network architectures that generate(s) intermediate data 372. The intermediate data 372 is input to the quantizer 364. The quantizer 364 can be implemented using a machine learning system (e.g., using a neural network system) or can be implemented using a Standards-based quantization and/or entropy coding techniques (e.g., arithmetic coding). For instance, in some cases, the encoder portion 362 can compress the input data 370 using the neural network techniques described herein, and can output the intermediate data 372 to the quantizer 364 for performing Standards-based quantization and/or entropy coding (e.g., arithmetic coding).

The quantizer 364 is configured to perform quantization and in some cases entropy coding of the intermediate data 372 to produce the output data 374. The output data 374 can include the quantized (and in some cases entropy coded) data. The quantization operations performed by the quantizer 364 can result in the generation of quantized codes (or data representing quantized codes generated by the machine learning coding system 310) from the intermediate data 372. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding Standards. In some examples, the quantization and/or entropy coding operations can be done by the machine learning coding system 310. In one illustrative example, the machine learning coding system 310 can be trained using supervised training, with residual data being used as input and quantized codes and entropy codes being used as known output (labels) during the training.

The decoder portion 366 of the machine learning coding system 310 is configured to receive the output data 374 (e.g., directly from quantizer 364 and/or from the storage medium 314). The decoder portion 366 can process the output data 374 to generate a representation 376 of the input data 370 at least partially based on the output data 374. In some examples, the decoder portion 366 of the machine learning coding system 310 includes a neural network 368 that may include one or more CNNs, one or more fully-connected neural networks, one or more GRUs, one or more Long short-term memory (LSTM) networks, one or more ConvRNNs, one or more ConvGRUs, one or more ConvLSTMs, one or more GANs, any combination thereof, and/or other types of neural network architectures.

The processor 304 is configured to send the output data 374 to at least one of the transmission medium 318 or the storage medium 314. For example, the output data 374 may be stored at the storage medium 314 for later retrieval and decoding (or decompression) by the decoder portion 366 to generate the representation 376 of the input data 370 as reconstructed data. The reconstructed data can be used for various purposes, such as for playback of video data that has been encoded/compressed to generate the output data 374. In some implementations, the output data 374 may be decoded at another decoder device that matches the decoder portion 366 (e.g., in the device 302, in the second device 390, or in another device) to generate the representation 376 of the input data 370 as reconstructed data. For instance, the second device 390 may include a decoder that matches (or substantially matches) the decoder portion 366, and the output data 374 may be transmitted via the transmission medium 318 to the second device 390. The second device 390 can process the output data 374 to generate the representation 376 of the input data 370 as reconstructed data.

The components of the system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 300 is shown to include certain components, one of ordinary skill will appreciate that the system 300 can include more or fewer components than those shown in FIG. 3. For example, the system 300 can also include, or can be part of a computing device that includes, an input device and an output device (not shown). In some implementations, the system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

In some implementations, the system 300 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

In one example, the machine learning coding system 310 can be incorporated into a portable electronic device that includes the memory 306 coupled to the processor 304 and configured to store instructions executable by the processor 304, and a wireless transceiver coupled to an antenna and to the processor 304 and operable to transmit the output data 374 to a remote device.

Neural network-based codecs (also referred to as neural codecs) can be successfully applied to data compression in many domains, including the image and video domain. For instance, a neural network encoder can take as input data x and produce a quantized latent variable y. A neural decoder can produce a reconstruction $\hat{x}$ given this latent. A neural prior or context model can be used to learn the distribution of latent variables p(y). Using this prior and an entropy coding algorithm, Shannon's source-coding theory indicates that the latent y can be losslessly compressed using log 2 p(y) bits. Neural codecs can be trained to minimize a rate-distortion loss including two terms:

$$L_{RD} = E_{x \sim p(x)}[\beta L_R + L_D]$$

The rate term LR corresponds to the number of bits needed to transmit the quantized latent variable z, and a distortion term LD corresponds to the distance between the reconstruction $\hat{x}$ and the ground truth x.

Neural codecs can provide several advantages over hand-crafted codecs. For instance, as they learn to identify redundancies from example data, they have shown a strong ability to specialize to a domain or even a single datapoint. In one example, if the codec will only be used to code animated content, it can easily be finetuned to this domain. Further, neural codecs can benefit from advances in general-purpose neural hardware, where most video codecs require dedicated hardware to run in real time on device. Neural codecs have also shown an ability to hallucinate (or generate) desirable textures, leading to improved perceptual quality compared to traditional codecs in user studies.

In the video setting, neural codec design has been inspired by techniques from handcrafted codecs. Some neural video codecs use frame interpolation or predicted entire blocks of frames jointly, while other neural video codecs exploit similarity between frames using motion compensation and residual coding. Having neural networks learn to perform these steps end-to-end has led to major bitrate savings in both the low latency, and streaming setting.

Although such learning-based video codecs can achieve promising performance for single-view video compression, they cannot be directly applied for effective stereo video compression (e.g., for automotive, XR systems, etc.), as it is unclear how these methods can effectively handle the inter-view redundancy, which is one of the core challenges in the stereo video compression task.

As noted previously, demand for stereo media (e.g., stereo video including a frame for a right eye and a frame for a left eye, which can be respectively referred to as a right view and left view) has increased along with the increase in popularity of various systems that can utilize such stereo media. One example of such systems are extended reality (XR) systems, which can provide virtual reality (VR), augmented reality (AR), and/or mixed reality (MR) experiences. For example, to participate in an XR experience, a user can wear an XR headset (e.g., an AR and/or VR head-mounted display, AR glasses, etc.) to create an immersive user experience. Such a device can be used to provide an XR experience with respect to gaming, education, virtual meetings, among other uses. Another example of such systems includes automotive (e.g., vehicle) systems.

A goal of stereo video is to provide a more complete "sense" or view of a surrounding environment for better experience (e.g., a better virtual experience in an XR environment, a more accurate automotive analysis by a vehicle system, etc.). A goal of stereo video streaming is to promptly transmit stereo video from a source (e.g., a video content provider, a source vehicle, etc.) to a target device (e.g., an XR device, a target vehicle, etc.) to enable a smooth experience (e.g., a smooth interactive virtual reality experiences or important automobile analysis).

However, stereo videos demand significantly higher bandwidth as compared to single-view videos. The efficient transmission of stereo video for devices that can utilize stereo video has become a crucial research topic. For example, it can be important to have an effective technique to compress a large amount of stereo video data. It can also be important to have a fast and efficient methods to compress and transmit stereo videos to provide effective stereo streaming.

Based on the handcrafted modules, traditional multiview image compression methods typically use disparity compensation for stereo image compression. For stereo video compression, standard Multiview Video Coding (MVC) methods can be extended from the standard video codecs. For example, the MVC extension of H.264 employ disparity compensation to exploit the interview redundancy. Extended from H.265, the standard MVHEVC adopted new techniques (e.g., the coding tree unit) to compress disparity information. However, such MVC standards might not be suitable for stereo video compression (e.g., for automotive, XR systems, etc.), as they are all based on the hand-crafted modules and thus prevent the joint optimization of the compression task together with other machine vision tasks (e.g., object detection) for the standard autonomous driving applications.

Some neural stereo image coding techniques can utilize deep stereo image compression (DSIC) by adopting a parametric skip function, while others may further employ homography estimation. However, such approaches are suitable for stereo image compression, without considering the temporal redundancy of stereo videos.

Considering the close spatial relationship between the left and right views in stereo videos, traditional methods for stereo video compression focus on reducing the inter-view redundancy between these views. For instance, existing solutions apply a single-view compression codec to one base view and then minimize redundancy for the other view based on spatial and appearance similarities between them.

Although these traditional methods have achieved promising results, and many of them have been incorporated into industry standards, stereo video compression remains a challenging task as these methods are based on hand-crafted features and cannot be end-to-end optimized.

As described above, systems and techniques are described herein for providing low-latency machine learning-based stereo streaming using a machine learning-based stereo video coding system (e.g., a coder-decoder or codec). The machine learning-based stereo video system can be implemented using a deep learning-based system, such as using a neural network, which can be referred to as a Low-Latency Neural Stereo Streaming (LLSS) system or codec. For example, the systems and techniques can be based on stereo video coding (e.g., encoding/compression and decoding/decompression) using a neural network model or system.

Stereo videos demand significantly higher bandwidth compared to single-view videos, which can be alleviated by the stereo video coding systems and techniques described herein. The machine learning-based stereo video system can learn to extract a latent (e.g., a latent representation, such as a feature vector) from stereo video frames and reconstruct one or more of the frames from the extracted latent, enabling end-to-end optimization. The systems and techniques can be used to provide fast and efficient compression and transmission of stereo videos.

Figure 4:
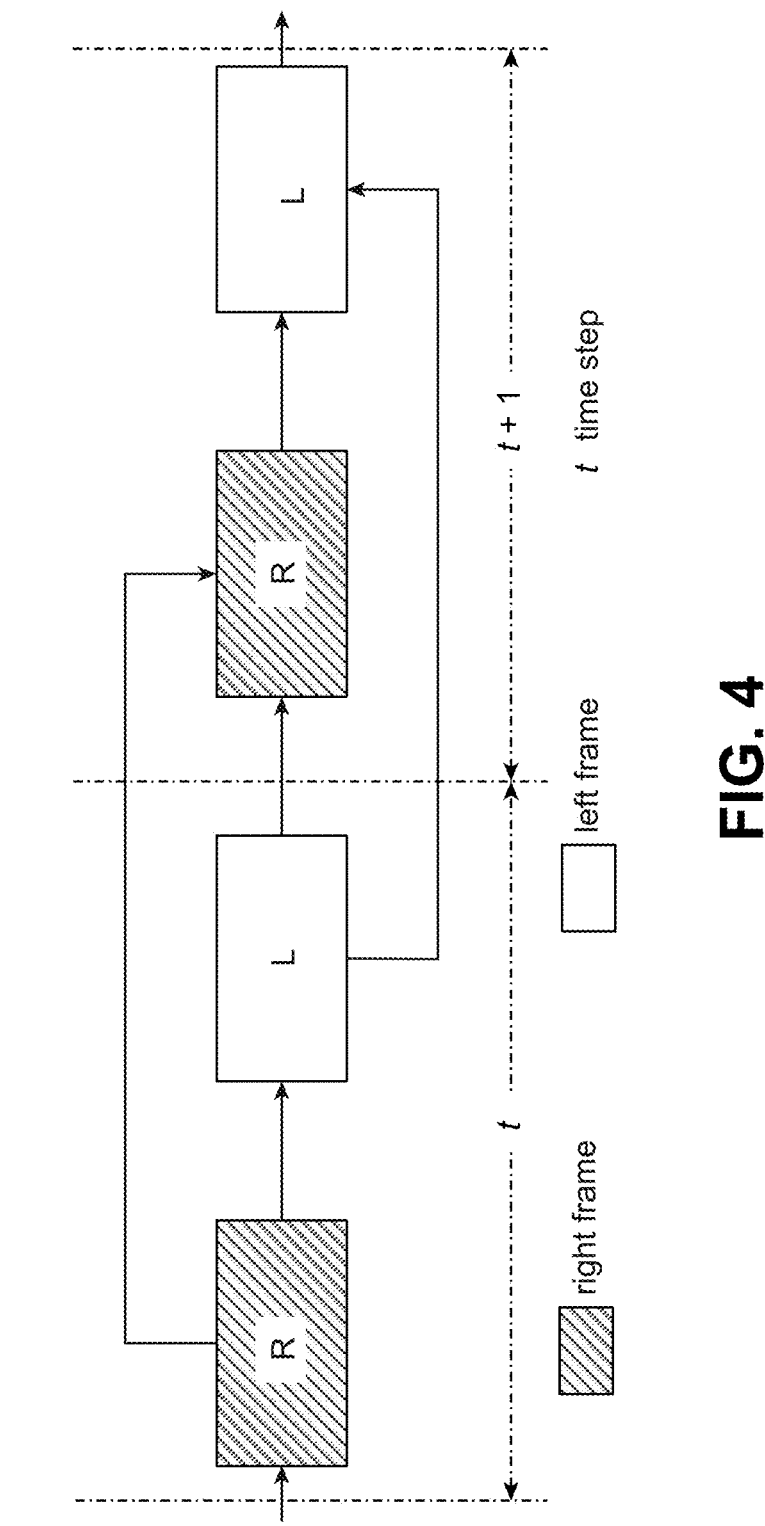
FIG. 4 is a diagram illustrating one example of a stereo video coding system, in accordance with some examples.

FIG. 4 is a diagram illustrating one example of a stereo video coding system 400, which can be implemented based on applying a single-view compression codec to one base view (e.g., the right frame base view, represented in FIG. 4 as the frames 'R' at time step t and t+1), and then minimizing redundancy for the other base view (e.g., the left frame base view, represented in FIG. 4 as the frames 'L' at time step t and t+1).

For example, within each time step t, t+1, . . . , etc., the stereo video coding system 400 processes the right and left frames sequentially. As shown in FIG. 4, the stereo video coding system 400 can compress the right frame 'R', and can subsequently (e.g., sequentially) compress the left frame 'L', based at least in part on the compression results for the right frame 'R'. For example, at each time step, the left frame 'L' can be compressed based on minimizing redundancy with the compressed base view already determined for the right frame 'R'.

To perform stereo video compression using the stereo video coding system 400, two motion compensation steps are performed for each frame at each time step (e.g., t, t+1, . . . , etc.). An intra-view motion compensation step is used to generate a prediction of the current frame, based on the same camera view from the previous frame. For example, the intra-view motion compensation step for the left frame L at time t+1 generates a prediction based on the left frame L at the previous time t, and the intra-view motion compensation step for the right frame R at time t+1 generates a prediction based on the right frame R at the previous time t.

In an inter-view motion compensation step, the other camera view in the currently processed frame (e.g., current time step) is used for the prediction. For example, in the inter-view motion compensation step for the left frame L at time t+1, the right frame R camera view also at time t+1 is used for the prediction of the left frame L at time t+1.

To compress a single frame (e.g., the left frame), the stereo video coding system 400 can leverage the information from the left frame from the left view at the previous timestep as well as the right frame from right view at the current timestep. For example, the left frame view at time step t+1 can be predicted or generated based on the left frame view from the previous time step t and the right frame view from the current time step t+1. The right frame view at time step t+1 can be predicted or generated based on the right frame view from the previous time step t and the left frame view from the previous time step t. While stereo video coding systems such as the system 400 can provide promising results, the sequential compression of the left and right frames makes parallel processing challenging and introduces latency between views.

Latency is a critical factor in various types of systems. In one illustrative example, latency can affect a user experience in XR environments (e.g., AR, VR, and/or MR environments). For instance, high latency can disrupt the immersive experience in an XR environment and can cause discomfort to users. Using a system similar to the stereo video coding system 400 of FIG. 4 can be associated with relatively large (e.g., relatively high) latency, which may be unsuitable for low-latency applications such as stereo video processing for XR or VR environments, stereo video processing for autonomous vehicles (AVs), etc., among various others.

Systems and techniques are described herein that can be used to provide a low-latency machine learning-based stereo video system (e.g., codec) to efficiently process stereo video content. In one example, the machine learning-based stereo video system includes a neural network-based stereo video codec. In some aspects, the neural network can include two parallel branches, a first branch dedicated to the left frame (e.g., including a left view of a scene) and a second branch dedicated to the right frame (e.g., including a right view of a scene). In some cases, to effectively capture a correspondence between the first and second branches, the system can include a multiscale shift-matching engine or module that horizontally shifts multiscale features extracted from both branches. Given the strong relationship between the left and right frames, a more robust hyper codec for individual frames can be generated by leveraging information from both frames.

The machine learning-based stereo video system enables parallel compression for stereo videos. The machine learning-based stereo video system can reduce cross-view redundancy and can be easily adapted for parallel coding optimization. In some cases, geometrical-temporal conditioning can be performed prior to efficient stereo video compression.

Using the machine learning (e.g., neural network)-based stereo video coding system described herein for stereo video can provide various advantages. For example, as previously noted, the machine learning-based stereo video codec described herein can minimize redundancy between the left and right frames (also referred to as views), such as by exploiting inter-frame information, which can enable more efficient compression without compromising visual quality. In another example, the machine learning-based stereo video codec described herein can simultaneously compress both left and right frames/views, as opposed to traditional methods that require sequential compression (e.g., the stereo video coding system 400 of FIG. 4). The machine learning-based stereo video codec can also eliminate inter-frame latency and accelerate the overall compression process (e.g., based on simultaneously compressing both views). For instance, the machine learning (e.g., neural network)-based stereo video codec can compress the left and right frames in parallel and can thus compress both frames simultaneously, effectively reducing the latency between the left and right frames/views and accelerating the overall compression process. The machine learning-based stereo video codec can also be readily adaptable for parallel coding optimization.

In some cases, the machine learning (e.g., neural network)-based stereo video codec can enable red-green-blue (RGB)-to-RGB compression without converting to a luma-chroma (e.g., YUV) format. Such a feature can streamline the compression workflow and maintain optimal color accuracy.

Figure 5:
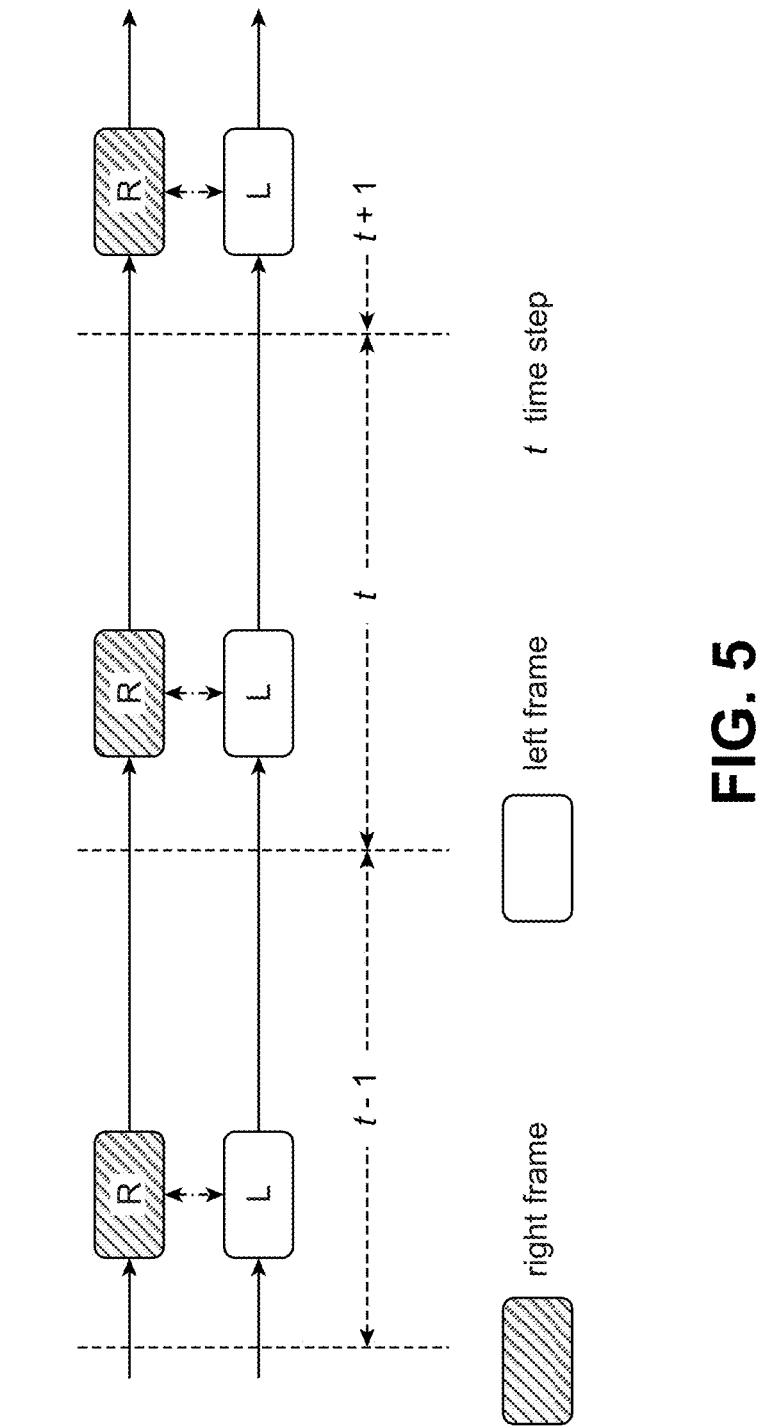
FIG. 5 is a diagram illustrating one example of a stereo video coding system using the systems and techniques described herein, in accordance with some examples.

FIG. 5 is a diagram illustrating one example of a machine learning-based stereo video coding system 500 using the systems and techniques described herein to provide parallel stereo video coding (e.g., parallel processing of the left and right frame views of stereo video data at each time step of a plurality of time steps). For example, at a time step t−1, the stereo video coding system 500 can process the right frame 'R' and the left frame 'L' simultaneously (e.g., in parallel). At the next time step t, the stereo video coding system 500 can process the right frame 'R' and the left frame 'L' simultaneously (e.g., in parallel). At the next time step t+1, the stereo video coding system 500 can process the right frame 'R' and the left frame 'L' simultaneously (e.g., in parallel).

As shown in FIG. 5, in contrast to the system 400 shown in FIG. 4, the stereo video coding system 500 can process the left and right frames of stereo video data simultaneously. The parallel processing or parallel stereo video coding implemented by the video coding system 500 of FIG. 5 can facilitate more efficient coding (e.g., more rate-efficient coding) and can also effectively reduce the latency between the left and right views.

For example, as noted above, the performance of a video codec can be significantly based on the ability of the video codec to eliminate redundant information. In some examples, temporal redundancy is commonly addressed (e.g., removed or eliminated) based on various motion compensation techniques, where one image is aligned with another image to reuse decoded information through a set of highly compressible motion vectors (e.g., such as optical flows, deformable kernels, etc.).

In some stereo video compression techniques (e.g., such as the stereo video compression using the sequential stereo video coding system 400 of FIG. 4), two motion compensation steps are performed for each stereo video frame (e.g., with a left camera view L and a right camera view R) at each time step (e.g., t, t+1, . . . , etc.). For example, an intra-view motion compensation step may be used to generate a prediction of the current frame, based on the same camera view from the previous frame. For example, the intra-view motion compensation step for the left frame L at time t+1 generates a prediction based on the left frame L at the previous time t, and the intra-view motion compensation step for the right frame R at time t+1 generates a prediction based on the right frame R at the previous time t. In an inter-view motion compensation step, the other camera view in the currently processed frame (e.g., current time step) is used for the prediction. For example, in the inter-view motion compensation step for the left frame L at time t+1, the right frame R camera view also at time t+1 is used for the prediction of the left frame L at time t+1.

In existing techniques for stereo video compression, the intra-view processing and the inter-view processing steps are executed in a sequential pattern, which can reduce or prevent the ability to implement parallel processing operations to leverage specific mutual information characteristics of the stereo videos. For example, stereo videos are typically rectified and highly-correlated. The disparity between two views of stereo video data (e.g., the disparity between the L and R views) may always be in the horizontal direction.

Based on reducing the redundant information between two views, stereo videos can be compressed more effectively and efficiently.

In one illustrative example, a stereo video can be represented as $\{X_t^L, X_t^R\}_{t \in \{1 \ldots T\}}$, where the stereo video includes T frames captured concurrently by a left (L) camera (e.g., a set of left-camera frames, $X_t^L$) and a right (R) camera (e.g., a set of right-camera frames, $X_t^R$). The stereo video can include temporal redundancy between consecutive frames $(X_t^L, X_{t+1}^L)$ and $(X_t^R, X_{t+1}^L)$. The stereo video can additionally include cross-view redundancy between $X_t^L$ and $X_t^R$.

Based on rate-distortion theory, the total bit rate $\mathcal{R}_L + \mathcal{R}_R$ to encode the two separate latents $Y^L$ and $Y^R$ generated by the encoders and/or decoders of the left and right views, respectively, with shared information can be represented as:

$$\mathcal{R}_L + \mathcal{R}_R \geq I\left(X_t^R, X_t^L; Y_t^L, Y_t^R\right) \qquad \text{Eq. (1)}$$

Here, $\mathcal{R}_L$, $\mathcal{R}_R$ represents the bit rate for the left and right views, respectively, and $I(X_t^R, X_t^L; Y_t^L, Y_t^R)$ represents the mutual information between the pair of random variables $(X_t^R, X_t^L)$ and $(Y_t^L, Y_t^R)$. Eq. (1) is lower bounded by:

$$I\left(X_t^R, X_t^L; Y_t^L, Y_t^R\right) \geq I\left(X_t^R, X_t^L; Y_t^L\right) + I\left(X_t^R, X_t^L; Y_t^R\right) \qquad \text{Eq. (2)}$$

A bit rate overhead $\mathcal{W}$ can be represented as:

$$\text{Eq. (3)}$$
$$\mathcal{W} = \left[I\left(X_t^R, X_t^L; Y_t^L\right) + I\left(X_t^R, X_t^L; Y_t^R\right)\right] - I\left(X_t^R, X_t^L; Y_t^L, Y_t^R\right) =$$
$$I\left(Y_t^L; Y_t^R\right) - I\left(Y_t^L; Y_t^R \mid X_t^R, X_t^L\right)$$

Comparing to the example of a single joint encoder/decoder with a single joint latent $U_t = (Y_t^L, Y_t^R)$ and $\mathcal{R} \geq I(X_t^R, X_t^L; Y_t^L, Y_t^R)$.

In some aspects, if $I(Y_t^L; Y_t^R) = 0$, based on $I(Y_t^L; Y_t^R | X_t^R, X_t^L) \geq 0$, the total bit rate overhead $\mathcal{W} \leq 0$. In some cases, to reduce the total bit rate overhead W, the machine-learning stereo video codec network can be configured to minimize $I(Y_t^L; Y_t^R)$. For example, the systems and techniques can enable this information-sharing between the parallel autoencoders (e.g., parallel motion autoencoder 630 and/or parallel context autoencoder 650) depicted in the example parallel stereo video coding architecture 600 of FIG. 6A.

Figure 6A:
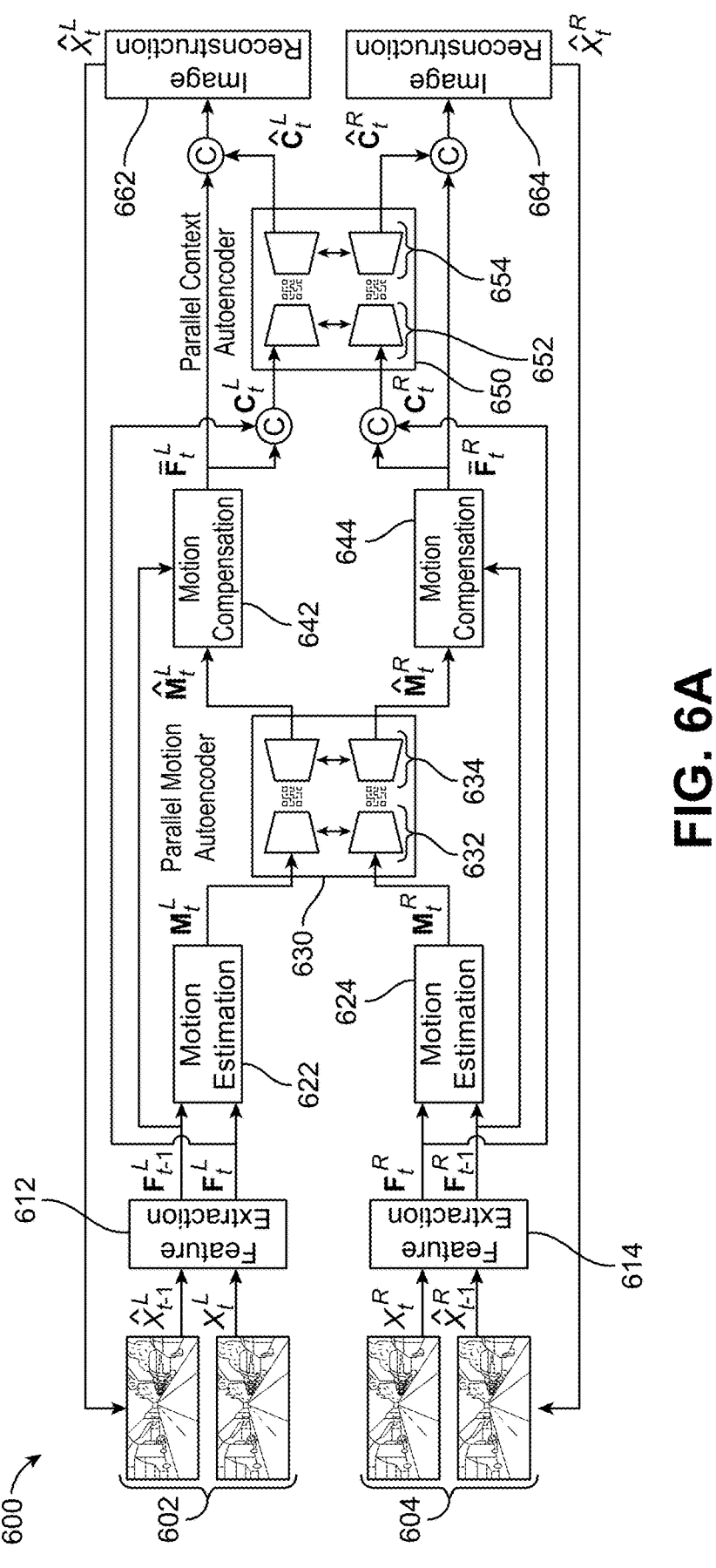
FIG. 6A is a diagram illustrating another example of a stereo video coding system using the systems and techniques described herein, in accordance with some examples.

FIG. 6A is a diagram illustrating an example of an overall architecture of the machine learning (e.g., neural network)-based stereo video codec 600 described herein. The machine learning stereo video codec can also be referred to as a machine learning (e.g., neural network)-based stereo video coding system.

In some aspects, the machine learning stereo video coding system 600 includes a first branch associated with processing left view images 602, and includes a right branch associated with processing right view images 604. For example, the first branch (e.g., also referred to as a left branch) can process the left view images 602 using a corresponding feature extractor 612, a motion estimation engine 622, the parallel motion autoencoder 630, a corresponding motion compensation engine 642, the parallel context autoencoder 650, and a corresponding image reconstruction engine 662. The second branch (e.g., also referred to as a right branch) can process the right view images 604 using a corresponding feature extractor 614, a motion estimation engine 624, the parallel motion autoencoder 630, a corresponding motion compensation engine 644, the parallel context autoencoder 650, and a corresponding image reconstruction engine 664.

The parallel motion autoencoder 630 includes parallel encoders 632 and parallel decoders 634, and can be used to reduce redundant motion information across the left and right views (e.g., associated with the processed left view images 602 and the processed right view images 604). The parallel context autoencoder 650 includes parallel encoders 652 and parallel decoders 654, and can be used to reduce the redundant context information across the left and right views. In some examples, weights may be shared across views, including the feature extraction engines 612 and 614, the motion estimation engines 622 and 624, the motion compensation engines 642 and 644, and the image reconstruction engines 662 and 664. Based on the dedicated left and right branches, and the shared weights across views, the systems and techniques and/or the machine learning stereo video coding system 600 can be used to provide synchronized and efficient processing of both views of a stereo video input in parallel.

As noted above, in some aspects, to reduce the total bit rate overhead $\mathcal{W}$ of Eq. (3), the machine-learning stereo video coding system 600 can be configured to minimize $I(Y_t^L; Y_t^R)$. For example, the systems and techniques can enable this information-sharing between the parallel motion autoencoder 630 and/or the parallel context autoencoder 650.

Both autoencoders (e.g., the parallel motion autoencoder 630 and the parallel context autoencoder 650) can be used to process both the left view associated with the left view images 602 and the right view associated with the right view images 604. In one illustrative example, the parallel motion autoencoder 630 and the parallel context autoencoder 650 can be configured to share information using a learned shifted attention module after each convolutional block. The learned shifted attention blocks can be used to provide information flow between the two left and right branches, and the stereo video coding system 600 can thereby learn to reduce the redundancy of the left and right branches (e.g., or the mutual information $I(Y^L; Y^R)$). In some aspects, the parallel design of the stereo video coding system 600 can be used to provide parallel processing for stereo video coding.

Figure 7A:
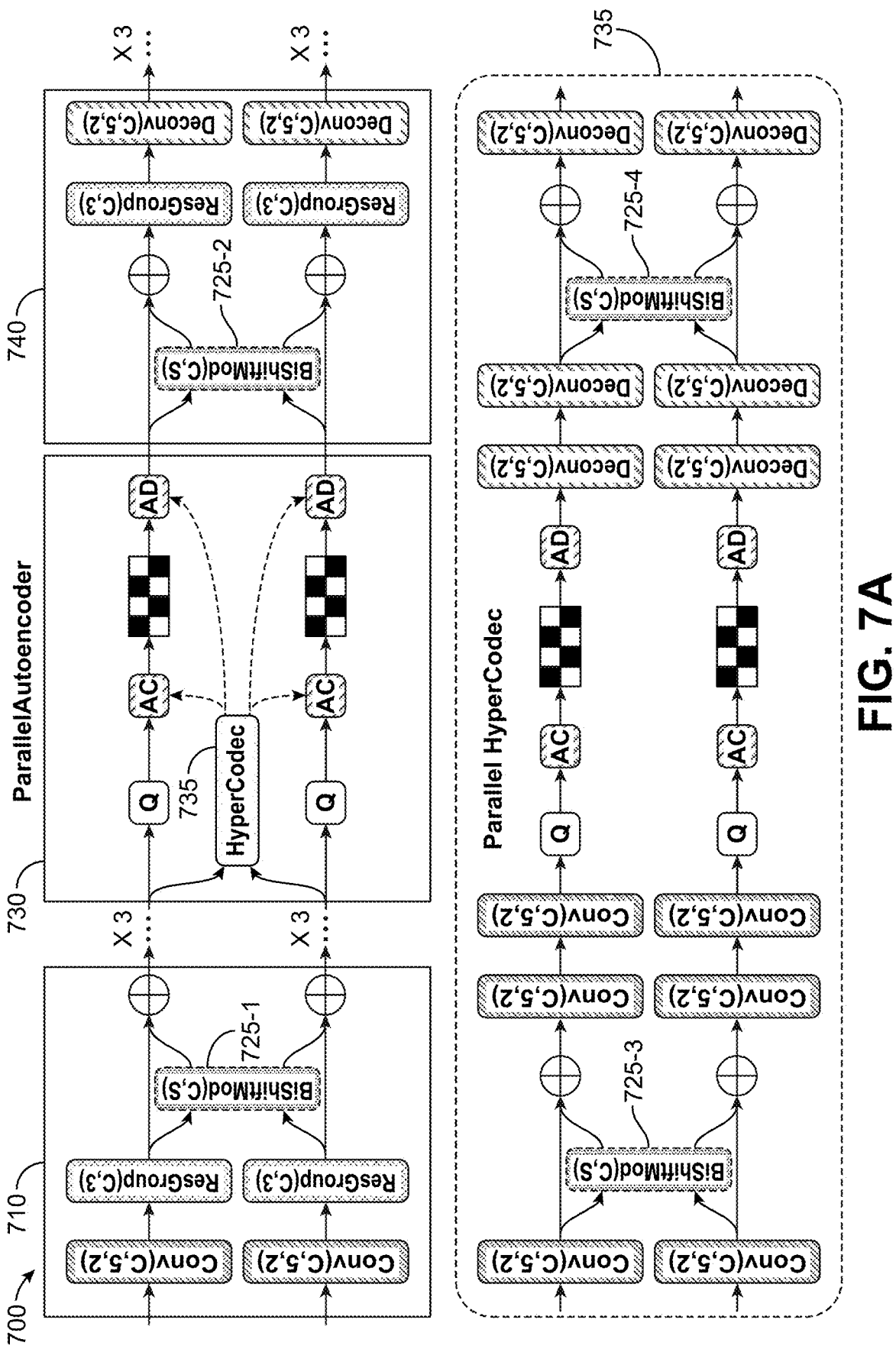
FIG. 7A is a diagram illustrating an example of an architecture of a stereo video coding system using the systems and techniques described herein, in accordance with some examples.
Figure 7B:
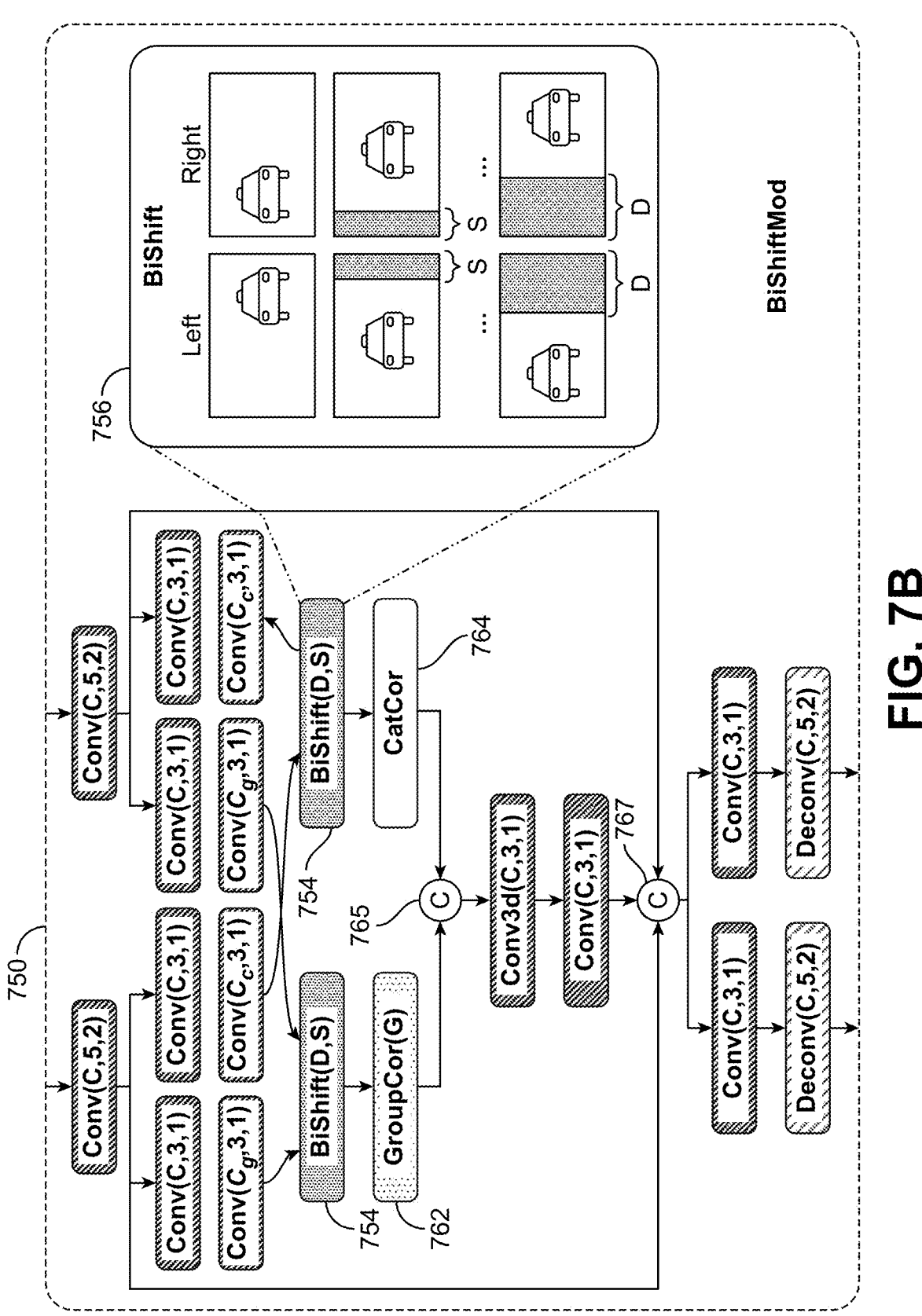
FIG. 7B is a diagram illustrating an example architecture of a bidirectional shift module that can be used to learn correlation between left and right branches of the stereo video coding system of FIG. 7A, in accordance with some examples.

Based on the information sharing configured for the parallel motion autoencoder 630 and configured for the parallel context autoencoder 650 (e.g., using the learned shifted attention described further with respect to FIGS. 7A and 7B), the systems and techniques can provide a reduction in the mutual information $I(Y_t^L; Y_t^R)$ between the left and right view latents.

In one illustrative example, to efficiently capture and exhibit the mutual information between the two branches (e.g., left and right) of the codec (e.g., stereo video coding system 600), the systems and techniques can utilize one or more bidirectional shift modules for the capture and transfer of the mutual information $I(Y_t^L; Y_t^R)$ between the left and right views in stereo video compression. The one or more bidirectional shift modules may be implemented as learned components, which can adapt to both flow and context latents between the two left and right views.

As noted above, a stereo video can be given as $\{X_t^L, X_t^R\}_{t\in\{1\,\ldots\,T\}}$, where the stereo video includes T frames captured concurrently by a left (L) camera (e.g., a set of left-camera frames, $X_t^L$) and a right (R) camera (e.g., a set of right-camera frames, $X_t^R$). The stereo video can include temporal redundancy between consecutive left frames 602 ($X_t^L$, $X_{t+1}^L$) and consecutive right frames 604 ($X_t^R$; $X_{t+1}^L$). The stereo video can additionally include cross-view redundancy between $X_t^L$ and $X_t^R$.

At each time step t, the machine learning stereo video coding system 600 can compress the left view associated with the left frames 602 and the right view associated with the right frames 604 in parallel. For example, the left branch can be used to compress the left image $X_t^L$ for the current time step t into a corresponding separated latent $Y_t^L$, and the right branch can be used to compress the right image $X_t^R$ for the current time step t into a corresponding separated latent $Y_t^R$.

Intra-view information can be shared using conditional coding, based on the encoders 632 and decoders 634 of the parallel motion autoencoder 630, and the encoders 654 and decoders 654 of the parallel motion autoencoder 650, sharing information originated from $\overline{F}_t$, which represents the warped feature from the previous timestep. Inter-view information flow can be implemented based on using the one or more bidirectional shift modules to bridge the intermediate features of the network 600 in both the codec and hyper codec of the two (e.g., left and right) branches.

Figures 6B, 6C:
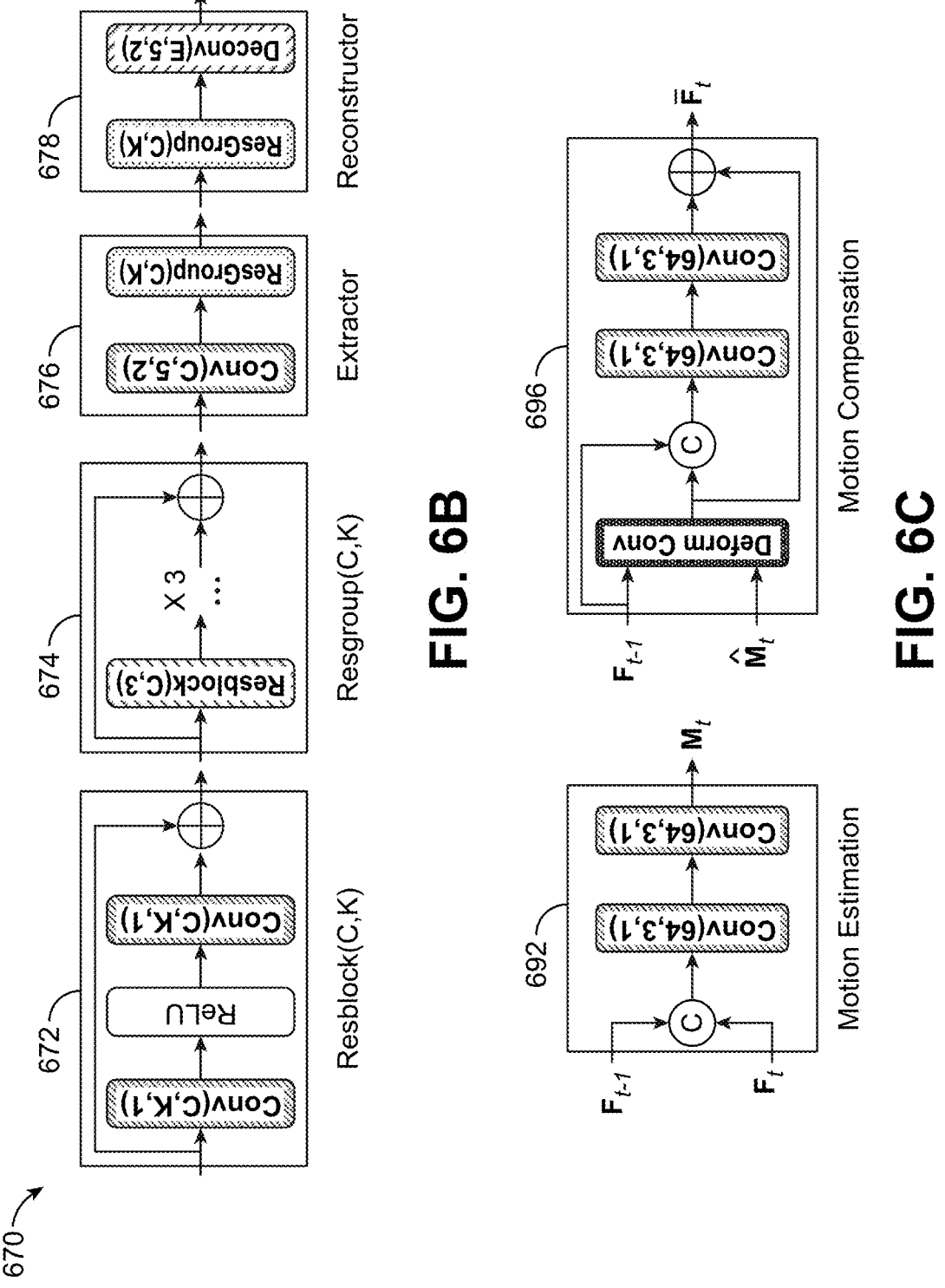
FIG. 6B is a diagram illustrating an example of a structure of the feature extractor and the image reconstructor of the machine learning-based stereo video coding system of FIG. 6A, in accordance with some examples.
FIG. 6C is a diagram illustrating an example of a structure of the motion estimation engine and the motion compensation engine of the machine learning-based stereo video coding system of FIG. 6A, in accordance with some examples.

FIG. 6B is a diagram illustrating an example architecture 670 that can be associated with and/or used to implement the feature extraction engines 612, 614 and/or the image reconstruction engines 662, 664 of the machine learning stereo video coding system 600 of FIG. 6A. For example, the extractor 676 of FIG. 6B can be the same as or similar to the feature extraction engines 612, 614 of FIG. 6A. The reconstructor 678 of FIG. 6B can be the same as or similar to the image reconstruction engines 662, 664 of FIG. 6A.

In some aspects, the feature extractor 676 can be used to extract the features from RGB input images (e.g., the left view input images 602 and/or the right view input images 604 of FIG. 6A), which may be subsequently compressed in the network (e.g., by one or more downstream operations of the machine learning stereo video coding system 600 of FIG. 6A). The feature extraction can be implemented based on downsampling the input image(s) using one or more strided convolutions, followed by multiple (e.g., a stack of) residual convolution blocks. For example, a Resblock(C,K) block 672 can include a Conv(C,K,1) layer, a ReLU activation layer, and an additional Conv(C,K,1) layer. A Resgroup(C, K) block 674 can include a plurality of Resblock(C,3) layers that are the same as or similar to the Resblock 672.

The feature extractor 676 can include one or more strided convolution layers Conv(C,5,2) followed by a ResGroup(C, K) layer used to implement the stack of residual convolutions. The ResGroup(C,K) layer included in the feature extractor 676 can be the same as or similar to the Resgroup (C,K) block 674 also shown in FIG. 6B.

The image reconstructor 678 can be used to synthesize final (e.g., output) RGB images from the reconstructed features generated by the machine learning stereo video coding system 600 of FIG. 6A. For example, in some aspects, the image reconstructor 678 can utilize a similar architecture to the feature extractor 676, and may include one residual convolution block (e.g., ResGroup(C,K), which may be the same as or similar to the Resgroup(C,K) block 674) and strided (de)convolutional layers (e.g., Deconv(E, 5,2)).

In one illustrative example, the weights of the feature extractor 676 and the image reconstructor 678 are shared between the left and right branches of the network 600, and both may include three ResGroup modules with a channel number of C=64, a kernel size of 3, and a stride of 1.

The feature extraction engine 612 of FIG. 6A (e.g., using the feature extraction architecture of the feature extractor 676 of FIG. 6B) can generate extracted features $F_t^L$ and $F_{t-1}^L$ for the left view 602 image frames $X_t^L$ and $\hat{X}_{t-1}^L$, respectively.

The feature extraction engine 614 of FIG. 6A (e.g., using the feature extraction architecture of the feature extractor 676 of FIG. 6B) can generate extracted features $F_t^R$ and $F_{t-1}^R$ for the right view 604 image frames $X_t^R$ and $\hat{X}_{t-1}^R$, respectively.

The extracted features can be provided to a respective motion estimation engine 622, 624 on the left and right branches of the machine learning stereo video coding system 600. For example, the left view features $F_t^L$ and $F_{t-1}^L$ can be provided as input to the left branch motion estimation engine 622, and the right view features $F_t^R$ and $F_{t-1}^R$ can be provided as input to the right branch motion estimating engine 624.

The left branch motion estimation engine 622 can generate an estimated motion $M_t^L$ between the two left view image frames 602, based on the extracted features $F_t^L$ and $F_{t-1}^L$ corresponding to the two left view image frames 602. The right branch motion estimation engine 624 can generate an estimated motion $M_t^R$ between the two right view image frames 604, based on the extracted features $F_t^R$ and $F_{t-1}^R$ corresponding to the two right view image frames 604.

In one illustrative example, the motion estimation engine 622 and/or 624 of FIG. 6A can be implemented using a machine learning architecture that is the same as or similar to the motion estimation engine 692 of FIG. 6C. For example, the motion estimation engine 692 can include a first convolutional layer (e.g., Conv(64,3,1)) and a second convolutional layer (e.g., Conv(64,3,1)). The motion estimation engine 692 can utilize as input the features $F_t$ and $\hat{F}_{t-1}$, and generates as output an estimate of the offset vectors $M_t$ between the input features $F_t$ and $\hat{F}_{t-1}$.

For example, where the motion estimation engine architecture 692 is used to implement the left branch motion estimation engine 622 of FIG. 6A, the input features $F_t$ and $\hat{F}_{t-1}$ of FIG. 6C can correspond to the two left view image frames 602 (e.g., $F_t^L$ and $F_{t-1}$), and the output estimate offset vectors $M_t$ of FIG. 6C can correspond to the estimated left view motion $M_t^L$. Where the motion estimation engine architecture 692 is used to implement the right branch motion estimation engine 624 of FIG. 6A, the input features $F_t$ and $\hat{F}_{t-1}$ of FIG. 6C can correspond to the two right view image frames 604 (e.g., $F_t^R$ and $F_{t-1}^R$), and the output estimate offset vectors $M_t$ of FIG. 6C can correspond to the estimated right view motion $M_t^R$.

The offset vectors $M_t$ between the input features $F_t$ and $\hat{F}_{t-1}$, estimated by the motion estimation engine architecture 692 of FIG. 6C, can subsequently be quantized, encoded, and provided to a decoder-side of the machine learning stereo video coding system 600 of FIG. 6A, for reconstruction to $M_t$. The coding process can be performed with a hyperprior-based machine learning network.

The motion compensation engine architecture 696 of FIG. 6C can be the same as or similar to an architecture used to implement the left branch motion compensation engine 642 of FIG. 6A and/or the right branch motion compensation engine 644 of FIG. 6A. In some aspects, the motion compensation engine architecture 696 of FIG. 6C can be used to generate the current feature maps based on warping $\hat{F}_{t-1}$ using $M_t$, through a deformable convolution. In one illustrative example, the motion compensation engine architecture 696 includes a deformable convolution layer, a skip connection, and two additional convolutions (e.g., Conv(64, 3,1)) to fuse the warped features with the previous feature $\hat{F}_{t-1}$. In some examples, the group number can be set to 8 in the deformable convolution layer for the motion compensation engine architecture 696.

In some examples, the motion estimation engine architecture 692 and the motion compensation engine architecture 696 of FIG. 6C can include two convolutional layers (e.g., Conv(64,3,1)) where both convolutional layers utilize a channel number of C=64, a kernel size of 3, and a stride of 1. ReLU can be used as the activation function.

The machine learning stereo video coding system 600 of FIG. 6A can include a parallel motion autoencoder 630 between the motion estimation engines 622, 624 and the motion compensation engines 642, 644. A parallel context autoencoder 650 can be provided between the motion compensation engines 642, 644 and the image reconstruction engines 662, 664.

The parallel motion autoencoder 630 and the parallel context autoencoder 650 each comprise two autoencoders running in parallel, and corresponding to the left and right views of the stereo video input. For example, the parallel motion autoencoder 630 includes a left branch encoder 632 and a right branch encoder 632, and includes a left branch decoder 634 and a right branch decoder 634. The parallel context autoencoder 650 includes a left branch encoder 652 and a right branch encoder 652, and a left branch decoder 654 and a right branch decoder 654. The parallel motion autoencoder 630 and the parallel context autoencoder 650 can be based on the parallel autoencoder architecture 700 of FIG. 7A, and may be the same as or similar to the parallel autoencoder 730 of FIG. 7A.

In some aspects, the parallel motion autoencoder 630 and the parallel context autoencoder 650 of FIG. 6A can each include a residual-based encoder configured to transform its input into a highly compressible latent, which is then coded using a hyperprior network before being decoded back to the expected output using another residual-based decoder.

In some examples, to enhance the intra-view information flow, a conditional autoencoder can be utilized for the parallel motion autoencoder 630. For example, in the conditional autoencoder, the current time step (e.g., current frame) feature $F_t$ extracted for the left frame view 602 or the right frame view 604 can be provided directly to the encoder 632, and both the encoder 632 and the decoder 634 for the particular branch (e.g., left branch or right branch) can be conditioned on the warped feature $\bar{F}_t$. In some aspects, the warped feature $\bar{F}_t$ can be fed into a hyper codec (e.g., the hyper codec 735 of FIG. 7A) to enhance the estimation of the parameters of the prior model.

FIG. 7A is a diagram illustrating an example architecture of a parallel autoencoder system 700 that can correspond to the parallel motion autoencoder 630 and/or the parallel context autoencoder 650 of FIG. 6A. For example, the parallel autoencoder 730 of FIG. 7A can be the same as or similar to the parallel motion autoencoder 630 and/or the parallel context autoencoder 650 of FIG. 6A.

The parallel autoencoder system 700 includes two parallel branches, which may be used to compress the left branch features and the right branch features (e.g., corresponding to the left view images 602 and the right view images 604, respectively, of FIG. 6A) simultaneously. The various machine learning layers shown in FIG. 7A are depicted using a "BlockType(width, kernel_size, stride)" representation. For example, the convolutional layers Conv(C,5,2) layers included in block 710 are convolutional blocks with a width of C, a kernel size of 5, and a stride of 2, etc.

In some aspects, the parallel autoencoder 730 includes a first (e.g., upper) branch which may correspond to the left view branch of FIG. 6A, and a second (e.g., lower) branch which may correspond to the right view branch of FIG. 6A. The upper branch of the parallel autoencoder 730 of FIG. 7A can include a quantization layer (e.g., 'Q'), an encoder (e.g., 'AC'), a decoder (e.g., 'AD'), and a latent representation between the encoder and the decoder. The lower branch of the parallel autoencoder 730 of FIG. 7A may be the same as or similar to the upper branch, and can include a quantization layer (e.g., 'Q'), an encoder (e.g., 'AC'), a decoder (e.g., 'AD'), and a latent representation between the encoder and the decoder. A hypercodec block 735 can be provided between the two branches of the parallel autoencoder 730, and can couple information and/or provide the flow of information across and/or between the two branches (e.g., across and/or between the left view and the right view for the parallel motion autoencoder 630 and the parallel context autoencoder 650 of the machine learning stereo video coding system 600 of FIG. 6A).

Inter-view information flow can be enhanced using one or more bidirectional shift modules, as noted above. For example, the one or more bidirectional shift modules 725-1, 725-2, 725-3, 725-4 of FIG. 7A can be the same as or similar to one another, and may be used to enhance inter-view information flow for the machine learning stereo video coding systems and techniques described herein. In some aspects, the one or more bidirectional shift modules 725-1, 725-2, 725-3, 725-4 of FIG. 7A can be implemented using the bidirectional shift module machine learning architecture 750 of FIG. 7B. In some aspects, the bidirectional shift module (e.g., 725-1, 725-2, 725-3, 725-4 of FIG. 7A; 750 of FIG. 7B) can be used to connect the encoder and decoder modules of the left and right branches together, to provide the flow of information across views.

The bidirectional shift module 725-1, 725-2, 725-3, 725-4 of FIG. 7A and/or 750 of FIG. 7B can be configured to learn the correlation between the left view and right view branches. The bidirectional shift module (e.g., 725-1, 725-2, 725-3, 725-4 of FIG. 7A and/or 750 of FIG. 7B) can shift the left and right features bidirectionally, to estimate the group-wise correlation (GroupCor) features and the concatenation-based correlation (CatCor) features between them. A convolutional 3D layer can be provided following the correlations, and may be used to merge the estimated GroupCor features and the estimated CatCor features.

For example, the bidirectional shift module architecture 750 of FIG. 7B (e.g., which can be used to implement the bidirectional shift modules 725-1, 725-2, 725-3, 725-4 of FIG. 7A) can receive as input a pair of inter-view features, one from each branch of the machine learning stereo video coding system 600 of FIG. 6A, and can generate as output a pair of enhanced features.

The bidirectional shift module architecture 750 can include a plurality of group-based convolutions on the input of each branch (e.g., the set of convolutions Conv(C,5,2), Conv(C,3,1), Conv(C,3,1), Conv($C_g$,3,1), Conv($C_c$,3,1)). The set of group-based convolutions on the input of each branch can be configured to transform the input inter-view features into a more representative form of intermediate features. The intermediate features generated using the set of group-based convolutional layers can be shifted using a corresponding bidirectional shift layer 754 (e.g., BiShift(D, S)) configured for each of the left view branch and the right view branch.

An example bidirectional shift operation 756 illustrates the parameters D and S used to parameterize the bidirectional shift layer 754 on each of the left view branch and the right view branch. For example, the parameter S represents the shift (e.g., a horizontal shift) per stride, which is the amount or distance of the horizontal shift performed for each stride. The parameter D represents the maximum distance to be shifted by the bidirectional shift layer 754.

In some aspects, the bidirectional shift layers 754 (e.g., BiShift(D,S)) can be configured to horizontally shift a left view feature $F_L$ to the left, and to horizontally shift a right view feature $F_R$ to the right, with a maximum disparity (e.g., maximum shift) of D and a stride of S.

Each set of shifted features (e.g., starting from the pair of non-shifted features of the intermediate representation from the set of group-based convolutional layers, and including the shifted pairs with shifts of S, 2S, 3S, . . . , D as shown in the example bidirectional shift operation 756) generated by each respective bidirectional shift layer 754 is then passed through a set of groupwise and concatenation-based machine learning layers 762 and 764, respectively, configured to estimate the correlations between and/or for the sets of shifted features. For example, the groupwise correlation can be estimated using the 'GroupCor(G)' layer(s) 762 of FIG. 7B, and the concatenation-based correlation can be estimated using the 'CatCor' layer(s) 674 of FIG. 7B.

In some aspects, the groupwise correlation GroupCor(G) layer(s) 762 can be used to measure similarity between the shifted features. For example, the groupwise correlation 762 can split the features into groups, and can calculate the cosine distance fort each group. In some examples, the shifted features can be evenly divided into G groups along the channel dimension. The groupwise correlation can be calculated using:

$$V_{gwc}(d, x, y, g) = \frac{1}{C_g/G}\langle F_g^L(x, y), F_g^R(x-d, y)\rangle \qquad \text{Eq. (4)}$$

In Eq. (4), the terms $\langle\bullet,\bullet\rangle$ and (x,y) respectively indicate an inner product and the pixel coordinates. The terms g and d represent the index of the groups and the disparity levels, respectively. $V_{gwc}$ can be defined in [D, H, W, G], where H, W represents the height and width of the feature map, respectively.

In one illustrative example, the concatenation-based correlation CatCor layer(s) 764 can be used to capture the similarity between the shifted features based on concatenating the shifted features. For example, in some aspects, the concatenation-based CatCor correlation layer(s) 764 may provide more context information that using the groupwise correlation GroupCor(G) layer(s) 762 alone, and may thereby assist the machine learning stereo video coding system 600 to better learn the redundancy between the left and right view branches. In some aspects, the concatenation-based correlation CatCor layer(s)l 764 can generate concatenation-based feature maps, based on concatenating the shifted features as:

$$V_{concat}(d, x, y) = F^L(x, y)\|F^R(x-d, y) \qquad \text{Eq. (5)}$$

In Eq. (5), '‖' indicates the concatenation operator along the shifted channels.

A concatenation operation 765 and a convolutional 3D layer (e.g., Conv3d(C,3,1)) can be used to merge the groupwise correlation features from the GroupCor block 762 with the concatenation-based correlation features from the Cat-Cor block 764. The estimated groupwise and concatenation-based correlations for the bidirectionally shifted intermediate features can be further transformed together with the input inter-view features, based on using a second concatenation operation 767 to combine the estimated correlations and the input inter-view features.

In some aspects, the sets of transformations and correlations implemented by the bidirectional shift module machine learning architecture 750 of FIG. 7B can be used to capture the redundancy between the inter-view features provided as input to the bidirectional shift module 750 (e.g., the inter-view features provided as input to the bidirectional shift module layers 725-1, 725-2, 725-3, 725-4 of FIG. 7A, which can be implemented using the bidirectional shift module architecture 750 of FIG. 7B), while feeding the inter-view features into each of the left and right encoders/decoders included in the parallel autoencoder 730 of FIG. 7A and/or the parallel motion autoencoder 630 and parallel context autoencoder 650 of FIG. 6A. The encoders and decoders can use the bidirectional shifting provided by the bidirectional shift module 750 and bidirectional shift module layers 725-1, 725-2, 725-3, 725-4 to share their respective information efficiently, and to reduce the mutual information between the inter-view latents before compression at the parallel autoencoder 730 of FIG. 7A and/or the parallel motion autoencoder 630 and parallel context autoencoder 650 of FIG. 6A.

In some aspects, the parallel motion autoencoder 630 of FIG. 6A can be implemented using the parallel autoencoder machine learning architecture 730 of FIG. 7A. For example, to implement the parallel motion autoencoder 630 of FIG. 6A, the parallel autoencoder machine learning architecture 730 of FIG. 7A can be parameterized using a number of channels C=64, and a number of channels C=128 for the parallel hypercodec 735. The ResGroup layers can be configured with a kernel size of 3 and a stride of 1. The convolutional layers, associated with feature downsampling, can utilize a kernel size of 5 and a stride of 2. The deconvolutional layers, associated with upsampling the features, can utilize a kernel size of 5 and a stride of 2. ReLU layers can be used for the activation function.

In some aspects, the parallel context autoencoder 650 of FIG. 6A can be implemented using the parallel autoencoder machine learning architecture 730 of FIG. 7A, parameterized with a number of channels C=128 for the parallel autoencoder 730 and C=128 for the parallel hypercodec 735. To match the channel number after concatenation layers, the parallel context autoencoder 650 can be implemented using one convolutional layer with a channel number of 128, kernel size of 3, and a stride of 1. ReLU can be used for the activation function.

The bidirectional shift module architecture 750 of FIG. 7B (e.g., which can be used to implement the bidirectional shift module layers 7235-1, 725-2, 725-3, 725-4 of FIG. 7A) can utilize a channel number of C=32, $C_g$=32, and $C_c$=12.

The group number G of the groupwise correlation layer(s) GroupCor(G) 762 can be set to G=4. In some examples, the maximum shift distance D for the bidirectional shift layers 754 BiShift(D,S) can be set as $D={}_{192}/2^{Scale-1}$, where Scale represents a configured downscale factor of the input feature maps with respect to the source image. In some examples, the shift stride S for the bidirectional shift layers 754 BiShift(D,S) can be configured as $S=\max(1,8/2^{Scale-1})$.

The bidirectional shift module 750 can be configured to downsample input features using a plurality of group convolutional layers with a kernel size of 5 and a stride of 2. The bidirectional shift module 750 can upsample the output features through deconvolutional layers with a kernel size of 5 and a stride of 2. The remaining convolutional layers can utilize a kernel size of 3 and a stride of 1. In some aspects, Mish can be used as the activation function.

In some aspects, the machine learning stereo video coding system 600 of FIG. 6A can be trained based on optimizing the entire network for the left and right views in an end-to-end manner. For example, end-to-end optimization of the machine learning stereo video coding system 600 of FIG. 6A can be implemented based on training using a rate-distortion loss:

$$\mathcal{L} = \sum_{v \in \{L,R\}} \sum_{t} D\left(X_t^v, \hat{X}_t^v\right) + \beta\left(\mathbb{H}\left(Y_{M,t}^v\right) + \mathbb{H}\left(Y_{C,t}^v\right)\right) \qquad \text{Eq. (6)}$$

In Eq. (6), D(•) represents a distortion metric for the reconstructed frames. In some aspects, the distortion metric can be a mean square error (MSE) loss and/or a multi-scale structural similarity index measure (MS-SSIM) loss, which evaluates the structural similarity between an image and a reference image at multiple scales or resolutions. In the representation of Eq. (6), hyper latents entropy is omitted for conciseness. The superscript v indicates which view is considered between Left (L) and Right (R). For each view v and time step t, $X_t^v$ represents the ground truth frame and $\hat{X}_t^v$ represents the reconstructed frame. The term $Y_{M,t}^v$ represents the quantized motion latent (e.g., from the parallel motion autoencoder 630 of FIG. 6A) and the term $Y_{C,t}^v$ represents the quantized context latent (e.g., from the parallel context autoencoder 650 of FIG. 6A). $\mathbb{H}$ (•) represents an entropy function, which can be proportional to the bitrate. β can indicate the hyper-parameter used to control the trade-off between the frame distortion and the rate.

In some examples, training can be performed in three stages. In a first training stage, single-view training can be performed using a large video dataset. In a second training stage, dual-view training can be performed using a stereo camera training dataset. In a third training stage, finetuning can be performed on a configured distortion metric (e.g., a distortion metric of interest for the trained machine learning stereo video coding system 600 of FIG. 6A).

In some aspects, the first stage single-view training can be performed based on randomly initializing a single view version of the machine learning stereo video coding system 600 of FIG. 6A (e.g., without the bidirectional shift modules 'BiShiftMod' 725-1, 725-2, 725-3, 725-4 of FIG. 7A and included in the parallel motion autoencoder 630 and parallel context autoencoder 650 of FIG. 6A). The single view model can be trained on the large video dataset having a large size and diversity, using MSE as the distortion loss.

In some examples, the second stage dual-view training can be performed using the resulting pre-trained weights from the first stage single-view training to initialize both branches (e.g., left branch corresponding to left view images 602 and right branch corresponding to right view images 604 of FIG. 6A) of the full stereo network 600 of FIG. 6A. The bidirectional shift modules 725-1, 725-2, 725-3, 725-4 (e.g., included within the parallel motion autoencoder 630 and the parallel context autoencoder 650 of FIG. 6A) can be trained while freezing all other modules. Training the bidirectional shift modules while freezing all other modules within the full stereo network 600 can stabilize the training process.

In the third and final training stage (e.g., finetuning stage), the full stereo network 600 from the second stage dual-view training can be finetuned on the same stereo video dataset used in the second stage dual-view training. In some aspects, when reporting MS-SSIM performance during the finetuning stage, a version of the full stereo network 600 can be used that is further finetuned using MS-SSIM as the distortion loss for an additional set of training (e.g., finetuning) iterations.

In some examples, across all three training stages, the Adam optimizer can be used and training can be performed with various β values (e.g., where β represents the hyper-parameter used to control the trade-off between the frame distortion and the rate). In some examples, the three training stages can be implemented using β values of [0.0002, 0.0004, 0.0008, 0.0016, 0.0032], etc., among various others, to obtain the rate curves. In some examples, a batch size of 8 can be utilized for the first, single-view training stage, and a batch size of 4 can be used for the second, dual-view training stage and or the third, finetuning training stage. In some examples, training samples can be generated based on randomly cropping with size 256×256 for the large video dataset used for the first, single-view training stage and size 384×256 for the full stereo video dataset used for the second, dual-view training stage and used for the third, finetuning training stage.

FIG. 8A is a flowchart diagram illustrating an example of a process 800 for encoding video data (e.g., including a left image and a right image corresponding to a stereo image or video view). In some examples, the process 800 can be performed by a computing device or apparatus or a component or system (e.g., one or more chipsets, one or more processors such as one or more CPUs, DSPs, NPUs, NSPs, microcontrollers, ASICs, FPGAs, programmable logic devices, discrete gates or transistor logic components, discrete hardware components, etc., any combination thereof, and/or other component or system) of the computing device or apparatus. The operations of the process 800 may be implemented as software components that are executed and run on one or more processors (e.g., processor 1110 of FIG. 11 or other processor(s)). In some examples, the process 800 can be performed by a machine learning network, including any of the machine learning networks corresponding to the machine learning (e.g., neural network)-based stereo video coding system 600 of FIG. 6A, the machine learning architectures of FIG. 6B and/or FIG. 6C, the parallel autoencoder machine learning architecture 700 of FIG. 7A, the bidirectional shift module machine learning architecture 750 of FIG. 7B, etc. In some aspects, the process 800 can be performed by a UE, smartphone, mobile computing device, user computing device, etc. The process 800 may be performed by an apparatus that may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 800 may be implemented as software components that are executed and run on one or more processors (e.g., processor 1110 of FIG. 11, and/or other processor(s)).

At block 802, the apparatus (or component thereof) can obtain video data comprising a temporal series of a plurality of images, the video data including at least a right-view image of a right view of a scene and a left-view image of a left view of the scene.

Figure 9D:
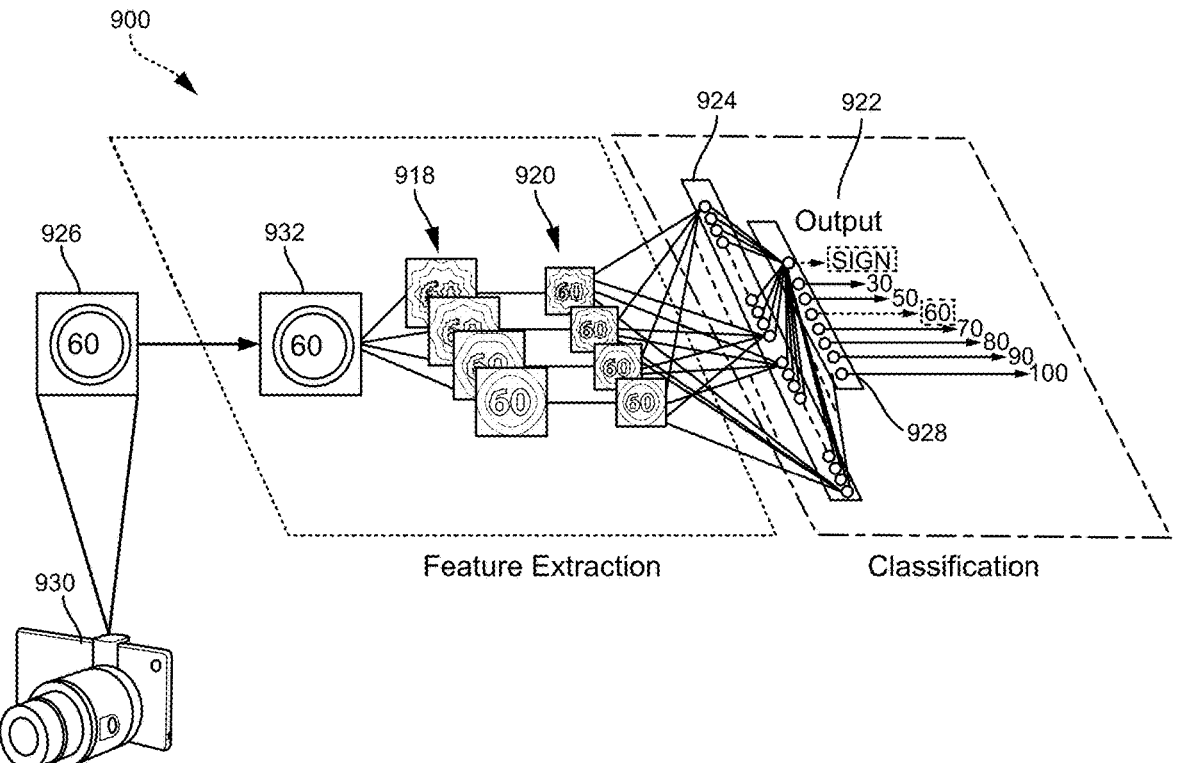
FIG. 9D illustrates a detailed example of a deep convolutional network (DCN) designed to recognize visual features from an image, in accordance with some examples.

For example, the video data can be obtained from the video source 202 of FIG. 2, can be obtained from or using the camera 307 of FIG. 3, can be obtained using the camera 930 of FIG. 9D, etc. In some cases, the right-view image of the right view of the scene can be the same as or similar to one or more of the right frames (e.g., 'R') of FIG. 4 and/or FIG. 5. In some cases, the left-view image of the left view of the scene can be the same as or similar to one or more of the left frames (e.g., 'L') of FIG. 4 and/or FIG. 5.

In some examples, the right-view image of the right view of the scene can be the same as or similar to one or more of the right-view images 604 of FIG. 6A (e.g., the time t or time t−1 right view images 604), and the left-view image of the left view of the scene can be the same as or similar to one or more of the left-view images 602 of FIG. 6A (e.g., the time t or time t−1 left view images 602). In some cases, the video data can include multiple right-view images each comprising an image of a right view of the scene at a respective time step (e.g., time t, t−1, t−2, . . . , etc.) and can include multiple left-view images each comprising an image of a left view of the scene at each respective time step included in the right view image. For example, the number of left view and right view images can be equal in the temporal series of the plurality of images of the video data.

At block 804, the apparatus (or component thereof) can compress the right-view image and the left-view image in parallel to generate a latent representation of the right-view image and the left-view image, wherein the right-view image and the left-view image are compressed in parallel based on inter-view information between the right-view image and the left-view image determined using one or more parallel autoencoders.

For example, the apparatus can implement the machine learning (e.g., neural network)-based stereo video coding system 600 of FIG. 6A to encode the video data. The encoder apparatus (e.g., transmitter of encoded video data) can include the entire network of FIG. 6A, where both encoding and decoding operations (e.g., associated with the parallel motion autoencoder 630 including encoders 632 and decoders 634, and the parallel context autoencoder 650 including the encoder 652 and decoders 654) are performed to generate an encoded bit stream corresponding to the video data obtained as input for compression. In some aspects, to implement a corresponding decoder to recover the compressed video data from the encoded bit stream, a decoder apparatus (e.g., receiver apparatus) can be implemented based on using a portion of the machine learning (e.g., neural network)-based stereo video coding system 600 of FIG. 6A. For example, the corresponding decoder apparatus can include the feature extraction engines 612, 614 of FIG. 6A; the decoders 634 of the parallel motion autoencoder 630 of FIG. 6A; the motion compensation engines 642, 644 of FIG. 6A; the decoders 654 of the parallel context autoencoder 650 of FIG. 6A; and the image reconstruction engines 662, 664 of FIG. 6B. An example of the corresponding decoder apparatus is described below with respect to FIG. 8B.

In some examples, to compress the right-view image and the left-view image in parallel to generate the latent representation at block 804, the apparatus (or component thereof) can use the parallel motion autoencoder 630 and/or the parallel context autoencoder 650 of FIG. 6A. For example, to compress the right-view image and the left-view image in parallel, the apparatus (or component thereof) can be configured to compress the right-view image based on features representing the right-view image and inter-view information corresponding to a correlation between the features of the right-view image and features of the left-view image. In some examples, the features representing the right-view image can be generated using the feature extraction engine 614 and the right-view images 604 of FIG. 6A. The features of the left-view image can be features representing the left-view images 602 and generated using the feature extraction engine 612 of FIG. 6A. The inter-view information corresponding to the correlation between the right-view image features and the left-view image features can be determined between the encoders 632 and/or decoders 634 included in the parallel motion autoencoder 630 of FIG. 6A.

In some examples, the apparatus (or component thereof) can be configured to compress the left-view image based on features representing the left-view image and inter-view information corresponding to a correlation between the features of the left-view image and features of the right-view image. The same inter-view information of the parallel motion autoencoder 630 can be used for compressing the right-view image(s) 604 and the left-view image(s) 602.

In some examples, the apparatus (or component thereof) can bidirectionally shift the features of the left-view image to generate shifted left-view image features, and can bidirectionally shift the features of the right-view image to generate shifted right-view image features. For example, the bidirectional shifting can be performed using the parallel motion autoencoder 630 of FIG. 6A and/or the bidirectional shift modules 725-1, 725-2, 725-3, 725-4 of FIG. 7A and/or the bidirectional shift module 750 of FIG. 7B. The bidirectional shifting may be the same as or similar to the bidirectional shift operation 756 of FIG. 7B.

In some examples, the apparatus (or component thereof) can determine the inter-view information corresponding to the correlation based on one or more correlations determined between the shifted right-view image features and the shifted left-view image features, for example using the group correlation 762 and/or categorical correlation 764 of the bidirectional shift module 750 of FIG. 7B.

In some cases, to compress the right-view image and the left-view image in parallel to generate the latent representation, the apparatus (or component thereof) can be configured to generate, using a first encoder of a parallel motion autoencoder, a first latent representation corresponding to motion information of the right-view image, wherein the first latent representation is generated based on features of the right-view image and inter-view features indicative of an estimated correlation between the right-view image and the left-view image. The apparatus (or component thereof) can additionally be configured to generate, using a second encoder of the parallel motion autoencoder, a second latent representation corresponding to motion information of the left-view image, wherein the second latent representation is generated based on features of the left-view image and the inter-view features.

For example, the first encoder of the parallel motion autoencoder can be the same as or similar to one of the encoders 632 of the parallel motion autoencoder 630 of FIG. 6A. The second encoder of the parallel motion autoencoder can be the same as or similar to the remaining one of the two encoders 632 of the parallel motion autoencoder 630 of FIG. 6A.

In some examples, the inter-view features are indicative of an estimated correlation between shifted features of the right-view image and shifted features of the left-view image. The shifted features of the right-view image can be the same as or similar to the bidirectionally shifted features from the first (e.g., right) bidirectional shift layer 754 of FIG. 7B, and the shifted features of the left-view image can be the same as or similar to the bidirectionally shifted features from the second (e.g., left) bidirectional shift layer 754 of FIG. 7B.

In some examples, the estimated correlation includes groupwise correlation features determined between the shifted features of the right-view image and the shifted features of the left-view image. For example, the estimated correlation can include groupwise correlation features determined using the groupwise correlation layer 762 of FIG. 7B.

In some examples, the estimated correlation includes concatenation-based correlation features determined between the shifted features of the right-view image and the shifted features of the left-view image. For example, the estimated correlation can include concatenation-based correlation features determined using the categorical correlation layer 764 of FIG. 7B.

In some cases, to compress the right-view image and the left-view image in parallel to generate the latent representation, the apparatus (or component thereof) can be configured to generate, using a first encoder of a parallel context autoencoder, a third latent representation corresponding to context information of the right-view image, and to generate, using a second encoder of the parallel context autoencoder, a fourth latent representation corresponding to context information of the left-view image. For example, the parallel context autoencoder can be the same as or similar to the parallel context autoencoder 650 of FIG. 6A. In some cases, the third latent representation can be generated using a first one of the parallel context encoders 652 included within the parallel context autoencoder 650 of FIG. 6A, and the fourth latent representation can be generated using a second one (e.g., the remaining one) of the two parallel context encoders 652 included within the parallel context autoencoder 650 of FIG. 6A.

In some examples, the third latent representation is generated based on warped right-view features of the right-view image and inter-view features indicative of an estimated correlation between the warped right-view features and warped left-view features corresponding to the left-view image. For example, the warped right-view features of the right-view image can be the same as or similar to motion-compensated features (e.g., compensated features) of the right view image(s) 604, generated using the motion compensation engine 644 of FIG. 6A.

In some cases, the fourth latent representation is generated based the warped left-view features and the inter-view features indicative of the estimated correlation between the warped right-view features and the warped left-view features. For example, the warped left-view features of the left-view image can be the same as or similar to motion-compensated features (e.g., compensated features) of the left-view image(s) 602, generated using the motion compensation engine 642 of FIG. 6A.

The inter-view features indicative of the estimated correlation between the warped right-view features and the warped left-view features can be determined using the parallel context autoencoder 650 of FIG. 6A, based on the warped features from the left and right motion compensation engines 642 and 644, respectively.

In some cases, the context information of the right-view image corresponds to a motion estimation residual associated with the right-view image, wherein the motion estimation residual associated with the right-view image is based on a concatenation of the warped right-view features and the features of the right-view image. For example, the motion estimation residual associated with the right-view image can be based on and/or can comprise the concatenation of the right view motion compensation engine 644 output (e.g., right-view image 604 warped or compensated features) with the originally extracted features of the right view image 604 generated by the feature extraction engine 614 of FIG. 6A.

In some examples, the context information of the left-view image corresponds to a motion estimation residual associated with the left-view image, wherein the motion estimation residual associated with the left-view image is based on a concatenation of the warped left-view features and the features of the left-view image. For example, the motion estimation residual associated with the left-view image can be based on and/or can comprise the concatenation of the left view motion compensation engine 642 output (e.g., left-view image 602 warped or compensated features) with the originally extracted features of the left view image 602 generated by the feature extraction engine 612 of FIG. 6A.

FIG. 8B is a flowchart diagram illustrating an example of a process 850 for decoding video data (e.g., including a left image and a right image corresponding to a stereo image or video view). In some examples, the process 850 can be performed by a computing device or apparatus or a component or system (e.g., one or more chipsets, one or more processors such as one or more CPUs, DSPs, NPUs, NSPs, microcontrollers, ASICs, FPGAs, programmable logic devices, discrete gates or transistor logic components, discrete hardware components, etc., any combination thereof, and/or other component or system) of the computing device or apparatus. The operations of the process 850 may be implemented as software components that are executed and run on one or more processors (e.g., processor 1110 of FIG. 11 or other processor(s)). In some examples, the process 850 can be performed by a machine learning network, including any of the machine learning networks corresponding to the machine learning (e.g., neural network)-based stereo video coding system 600 of FIG. 6A, the machine learning architectures of FIG. 6B and/or FIG. 6C, the parallel autoencoder machine learning architecture 700 of FIG. 7A, the bidirectional shift module machine learning architecture 750 of FIG. 7B, etc. In some aspects, the process 850 can be performed by a UE, smartphone, mobile computing device, user computing device, etc. The process 850 may be performed by an apparatus that may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 850 may be implemented as software components that are executed and run on one or more processors (e.g., processor 1110 of FIG. 11, and/or other processor(s)).

At block 852, the apparatus (or component thereof) can obtain a first reconstructed right-view image of a right view of a scene at a first time step and a first reconstructed left-view image of a left view of the scene at the first time step.

For example, the apparatus used to implement the operations of process 850 of FIG. 8B can be a decoder apparatus (e.g., receiver) used to decode encoded video data generated by a corresponding encoder apparatus (e.g., transmitter), where the corresponding encoder or transmitter apparatus can be the same as or similar to the encoder apparatus associated with the encoding process 800 of FIG. 8A.

For example, at block 852, the apparatus (or component thereof) can obtain the first reconstructed right-view image of the right view of the scene at the first time step, and the first reconstructed left-view image of the left view of the scene at the first time step from the corresponding encoding apparatus. For example, the corresponding encoding apparatus can implement the machine learning (e.g., neural network)-based stereo video coding system 600 of FIG. 6A to encode the video data. The encoder apparatus (e.g., transmitter of encoded video data) can include the entire network of FIG. 6A, where both encoding and decoding operations (e.g., associated with the parallel motion autoencoder 630 including encoders 632 and decoders 634, and the parallel context autoencoder 650 including the encoder 652 and decoders 654) are performed to generate an encoded bit stream corresponding to the video data obtained as input for compression.

In some examples, to implement a decoder to recover the compressed video data from the encoded bit stream, the decoder apparatus (e.g., receiver apparatus) associated with the process 850 of FIG. 8B can be implemented based on using a portion of the machine learning (e.g., neural network)-based stereo video coding system 600 of FIG. 6A. For example, the corresponding decoder apparatus can include the feature extraction engines 612, 614 of FIG. 6A; the decoders 634 of the parallel motion autoencoder 630 of FIG. 6A; the motion compensation engines 642, 644 of FIG. 6A; the decoders 654 of the parallel context autoencoder 650 of FIG. 6A; and the image reconstruction engines 662, 664 of FIG. 6B.

In some cases, the reconstructed right-view image of the right view of the scene can be generated using the decoder apparatus and the operations of process 850 for a previous time step (e.g., time step t–1) relative to the current time step (e.g., time step t). The reconstructed left-view image of the left view of the scene can be generated using the decoder apparatus and the operations of process 850 for the same previous time step (e.g., time step t–1) relative to the same current time step (e.g., time step t). For example, the reconstructed right-view image can be generated using the image reconstruction engine 664 of FIG. 6A at a first time step (e.g., previous time step t–1) and the reconstructed left-view image can be generated using the image reconstruction engine 662 of FIG. 6A at the first time step (e.g., previous time step t–1).

At block 854, the apparatus (or component thereof) can obtain encoded motion information associated with a compressed right-view image and a compressed left-view image.

For example, encoded motion information associated with the compressed right-view image can be obtained from a first motion estimation engine of an encoder apparatus implementing the architecture 600 of FIG. 6A and encoded motion information associated with the compressed left-view image can be obtained from a second motion estimation engine of the encoder apparatus. In some examples, the encoded motion information associated with the compressed right-view image can be obtained from the motion estimation engine 624 of FIG. 6A, and encoded motion information associated with the compressed left-view image can be obtained from the motion estimation engine 622 of FIG. 6A.

In some cases, to obtain the encoded motion information, the apparatus (or component thereof) can obtain, from one or more encoders of a parallel motion autoencoder, a latent representation associated with the compressed right-view image and the compressed left-view image. For example, a latent representation associated with the compressed right-view image can be obtained from a first encoder of the pair of encoders 632 of the parallel motion autoencoder 630 of FIG. 6A, and a latent representation associated with the compressed left-view image can be obtained from a second encoder of the pair of encoders 632 of the parallel motion autoencoder 630 of FIG. 6A.

At block 856, the apparatus (or component thereof) can decode the encoded motion information to generate reconstructed motion information.

For example, the apparatus (or component thereof) can decode, using one or more decoders corresponding to the one or more encoders of the parallel motion autoencoder, the latent representation associated with the compressed right-view image and the compressed left-view image. The one or more decoders can be included in the apparatus. In some examples, the one or more decoders can be the same as or similar to the decoders 634 included in the parallel motion autoencoder 630 of FIG. 6A. The one or more decoders used to decode the latent representation associated with the compressed right-view image and the latent representation associated with the compressed left-view image can be the same as or similar to the one or more decoders included in the parallel motion autoencoder 630 of the corresponding encoder apparatus implementing the architecture 600 of FIG. 6A and used to generate the encoded motion information.

The reconstructed motion information can correspond to the motion estimation information generated for the left-view image 602 by the motion extraction engine 622 and provided to the first encoder of the corresponding encoder apparatus parallel motion encoders 632 of FIG. 6A, and to the motion estimation information generated for the right-view image 604 by the motion extraction engine 624 and provided to the second encoder of the corresponding encoder apparatus parallel motion encoder 632 of FIG. 6A.

At block 858, the apparatus (or component thereof) can warp, using the reconstructed motion information, the first reconstructed right-view image and the first reconstructed left-view image to generate a second reconstructed right-view image of a right view of the scene at a second time step and a second reconstructed left-view image of a left view of the scene at the second time step.

For example, the reconstructed motion information of the left-view image can be provided to a corresponding motion compensation engine of the apparatus, which may be the same as or similar to the motion compensation engine 642 of FIG. 6A. The reconstructed motion information of the right-view image can be provided to a corresponding motion compensation engine of the apparatus, which can be the same as or similar to the motion compensation engine 644 of FIG. 6A.

The motion compensation engines of the decoder apparatus can use the corresponding left or right reconstructed motion information to generate left or right (respectively) motion compensation information, which can be combined (e.g., concatenated) with a decoded parallel context latent representation associated with the left or right view images (respectively).

For example, the left-view reconstructed motion compensation information can be generated using the motion compensation engine 642 of FIG. 6A. Corresponding encoded parallel context information of the left-view image can be obtained and decoded by a first parallel context decoder of the apparatus (e.g., a first one of the parallel context decoders 654 of FIG. 6A) to generate reconstructed parallel context information of the left-view image. The left-view reconstructed motion compensation information can be combined (e.g., concatenated) with the decoded (e.g., reconstructed) parallel context information of the left-view image, and used by a corresponding left-view image reconstruction engine 662 of FIG. 6A to generate the second left-view image of the left view of the scene at the second time step.

The right-view reconstructed motion compensation information can be generated using the motion compensation engine 644 of FIG. 6A. Corresponding encoded parallel context information of the right-view image can be obtained and decoded by a second parallel context decoder of the apparatus (e.g., a second one of the parallel context decoders 654 of FIG. 6A) to generate reconstructed parallel context information of the right-view image. The right-view reconstructed motion compensation information can be combined (e.g., concatenated) with the decoded (e.g., reconstructed) parallel context information of the right-view image, and used by a corresponding right-view image reconstruction engine 664 of FIG. 6A to generate the second right-view image of the right view of the scene at the second time step.

In some examples, the apparatus (or component thereof) can generate the second reconstructed right-view image of the right view of the scene at the second time step in parallel with the second reconstructed left-view image of the left view of the scene at the second time step. In some cases, the apparatus (or component thereof) can warp the first reconstructed right-view image with a portion of the reconstructed motion information corresponding to the compressed right-view image, using a parallel autoencoder configured to determine inter-view information between a right-view image processing branch and a left-view image processing branch of the apparatus. For examples, the apparatus (or component thereof) can warp the first reconstructed left-view image with a portion of the reconstructed motion information corresponding to the compressed left-view image, using the parallel autoencoder and the inter-view information between the right-view image processing branch and the left-view image processing branch of the apparatus.

In some cases, the right-view image processing branch corresponds to the first reconstructed right-view image, the compressed right-view image, and the second reconstructed right-view image. In some examples, the left-view image processing branch corresponds to the first reconstructed left-view image, the compressed left-view image, and the second reconstructed left-view image. In some cases, the inter-view information corresponds to one or more correlations determined between right-view features associated with the right-view image processing branch and left-view features associated with the left-view image processing branch. In some examples, the apparatus (or component thereof) can be configured to bidirectionally shift the right-view features to generate shifted right-view features, and to bidirectionally shift the left-view features to generate shifted left-view features. The apparatus (or component thereof) can determine the inter-view information corresponding to the one or more correlations based on one or more correlations determined between the shifted right-view features and the shifted left-view features.

In some examples, the processes described herein (e.g., the process 800, the process 850, and/or any other process described herein) may be performed by a computing device or apparatus. In one example, the process 800, the process 850, and/or other technique or process described herein can be performed by a computing system having an architecture according to any of FIGS. 1-7B. In another example, the process 800, the process 850, and/or other technique or process described herein can be performed by the computing system 1100 shown in FIG. 11. In some examples, the computing device can include a mobile device (e.g., a mobile phone, a tablet computing device, etc.), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The processes described herein may be illustrated or described as a logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As noted previously, some video coding systems utilize neural networks or other machine learning systems to compress video and/or image data. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 9A illustrates an example of a fully connected neural network 902. In a fully connected neural network 902, a neuron in a first layer may communicate its output to every neuron in a second layer, so that each neuron in the second layer will receive input from every neuron in the first layer. FIG. 9B illustrates an example of a locally connected neural network 904. In a locally connected neural network 904, a neuron in a first layer may be connected to a limited number of neurons in the second layer. More generally, a locally connected layer of the locally connected neural network 904 may be configured so that each neuron in a layer will have the same or a similar connectivity pattern, but with connections strengths that may have different values (e.g., 910, 912, 914, and 916). The locally connected connectivity pattern may give rise to spatially distinct receptive fields in a higher layer, because the higher layer neurons in a given region may receive inputs that are tuned through training to the properties of a restricted portion of the total input to the network.

One example of a locally connected neural network is a convolutional neural network. FIG. 9C illustrates an example of a convolutional neural network 906. The convolutional neural network 906 may be configured such that the connection strengths associated with the inputs for each neuron in the second layer are shared (e.g., 908). Convolutional neural networks may be well suited to problems in which the spatial location of inputs is meaningful. Convolutional neural network 906 may be used to perform one or more aspects of video compression and/or decompression, according to aspects of the present disclosure.

One type of convolutional neural network is a deep convolutional network (DCN). FIG. 9D illustrates a detailed example of a DCN 900 designed to recognize visual features from an image 926 input from an image capturing device 930, such as a car-mounted camera. The DCN 900 of the current example may be trained to identify traffic signs and a number provided on the traffic sign. Of course, the DCN 900 may be trained for other tasks, such as identifying lane markings or identifying traffic lights.

The DCN 900 may be trained with supervised learning. During training, the DCN 900 may be presented with an image, such as the image 926 of a speed limit sign, and a forward pass may then be computed to produce an output 922. The DCN 900 may include a feature extraction section and a classification section. Upon receiving the image 926, a convolutional layer 932 may apply convolutional kernels (not shown) to the image 926 to generate a first set of feature maps 918. As an example, the convolutional kernel for the convolutional layer 932 may be a 5×5 kernel that generates 28×28 feature maps. In the present example, because four different feature maps are generated in the first set of feature maps 918, four different convolutional kernels were applied to the image 926 at the convolutional layer 932. The convolutional kernels may also be referred to as filters or convolutional filters.

The first set of feature maps 918 may be subsampled by a max pooling layer (not shown) to generate a second set of feature maps 920. The max pooling layer reduces the size of the first set of feature maps 918. That is, a size of the second set of feature maps 920, such as 14×14, is less than the size of the first set of feature maps 918, such as 28×28. The reduced size provides similar information to a subsequent layer while reducing memory consumption. The second set of feature maps 920 may be further convolved via one or more subsequent convolutional layers (not shown) to generate one or more subsequent sets of feature maps (not shown).

In the example of FIG. 9D, the second set of feature maps 920 is convolved to generate a first feature vector 924. Furthermore, the first feature vector 924 is further convolved to generate a second feature vector 928. Each feature of the second feature vector 928 may include a number that corresponds to a possible feature of the image 926, such as "sign," "60," and "100." A softmax function (not shown) may convert the numbers in the second feature vector 928 to a probability. As such, an output 922 of the DCN 900 is a probability of the image 926 including one or more features.

In the present example, the probabilities in the output 922 for "sign" and "60" are higher than the probabilities of the others of the output 922, such as "30," "40," "50," "70," "80," "90," and "100". Before training, the output 922 produced by the DCN 900 is likely to be incorrect. Thus, an error may be calculated between the output 922 and a target output. The target output is the ground truth of the image 926 (e.g., "sign" and "60"). The weights of the DCN 900 may then be adjusted so the output 922 of the DCN 900 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 922 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information associated with the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 920) receiving input from a range of neurons in the previous layer (e.g., feature maps 918) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 10:
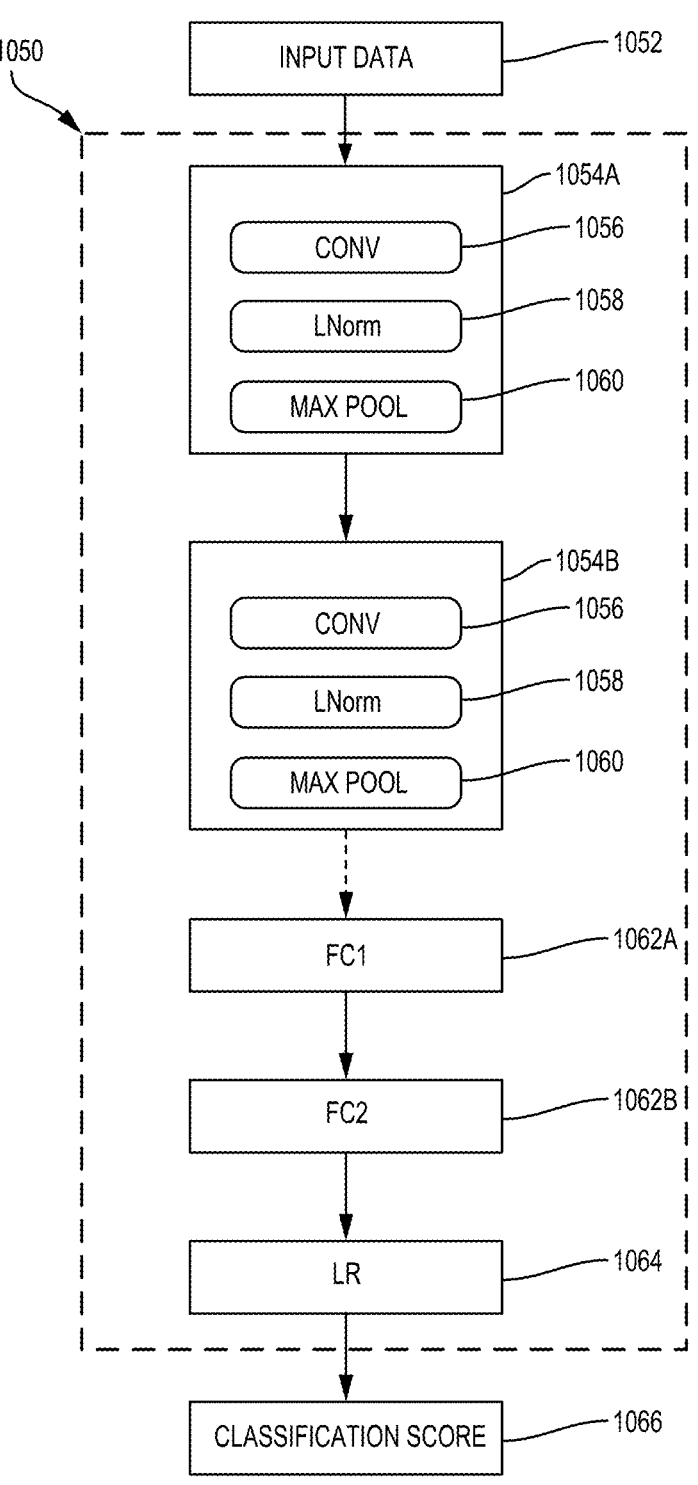
FIG. 10 is a block diagram illustrating a deep convolutional network (DCN), in accordance with some examples.

FIG. 10 is a block diagram illustrating an example of a deep convolutional network 1050. The deep convolutional network 1050 may include multiple different types of layers based on connectivity and weight sharing. As shown in FIG. 10, the deep convolutional network 1050 includes the convolution blocks 1054A, 1054B. Each of the convolution blocks 1054A, 1054B may be configured with a convolution layer (CONV) 1056, a normalization layer (LNorm) 1058, and a max pooling layer (MAX POOL) 1060.

The convolution layers 1056 may include one or more convolutional filters, which may be applied to the input data 1052 to generate a feature map. Although only two convolution blocks 1054A, 1054B are shown, the present disclosure is not so limiting, and instead, any number of convolution blocks (e.g., blocks 1054A, 1054B) may be included in the deep convolutional network 1050 according to design preference. The normalization layer 1058 may normalize the output of the convolution filters. For example, the normalization layer 1058 may provide whitening or lateral inhibition. The max pooling layer 1060 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative aspects, the parallel filter banks may be loaded on the DSP 106 or an ISP 116 of an SOC 100. In addition, the deep convolutional network 1050 may access other processing blocks that may be present on the SOC 100, such as sensor processor 114 and navigation module 120, dedicated, respectively, to sensors and navigation.

The deep convolutional network 1050 may also include one or more fully connected layers, such as layer 1062A (labeled "FC1") and layer 1062B (labeled "FC2"). The deep convolutional network 1050 may further include a logistic regression (LR) layer 1064. Between each layer 1056, 1058, 1060, 1062A, 1062B, 1064 of the deep convolutional network 1050 are weights (not shown) that are to be updated. The output of each of the layers (e.g., 1056, 1058, 1060, 1062A, 1062B, 1064) may serve as an input of a succeeding one of the layers (e.g., 1056, 1058, 1060, 1062A, 1062B, 1064) in the deep convolutional network 1050 to learn hierarchical feature representations from input data 1052 (e.g., images, audio, video, sensor data and/or other input data) supplied at the first of the convolution blocks 1054A. The output of the deep convolutional network 1050 is a classification score 1066 for the input data 1052. The classification score 1066 may be a set of probabilities, where each probability is the probability of the input data including a feature from a set of features.

Figure 11:
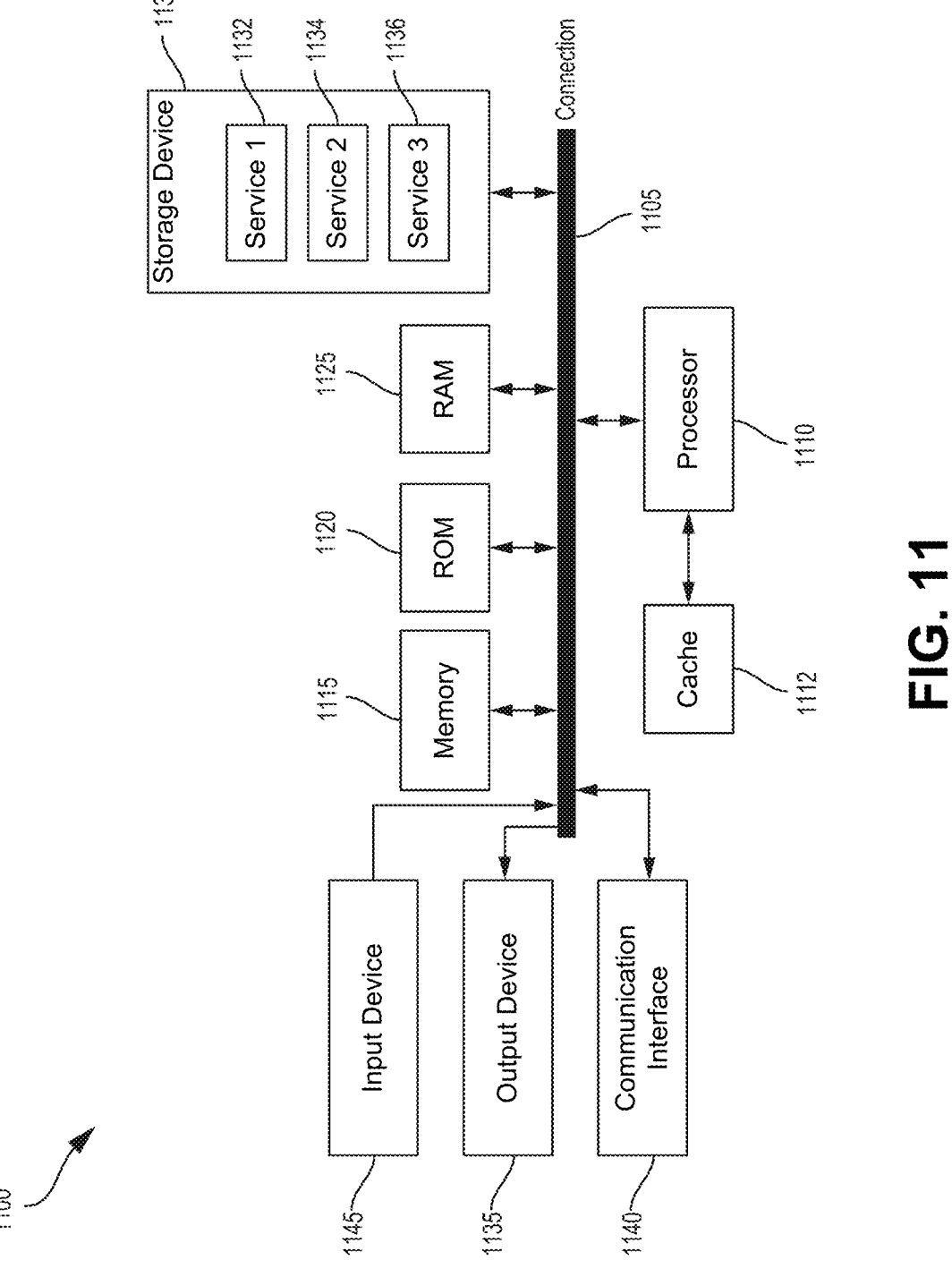
FIG. 11 illustrates an example computing device architecture of an example computing device which can implement the various techniques described herein.

FIG. 11 illustrates an example computing device architecture 1100 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1100 can be used as part of the system 200 of FIG. 2 and/or the system 300 of FIG. 3. The components of computing device architecture 1100 are shown in electrical communication with each other using connection 1105, such as a bus. The example computing device architecture 1100 includes a processing unit (CPU or processor) 1110 and computing device connection 1105 that couples various computing device components including computing device memory 1115, such as read only memory (ROM) 1120 and random access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In this way, the cache can provide a performance boost that avoids processor 1110 delays while waiting for data. These and other modules can control or be configured to control processor 1110 to perform various actions. Other computing device memory 1115 may be available for use as well. Memory 1115 can include multiple different types of memory with different performance characteristics. Processor 1110 can include any general purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than ("≥") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for encoding video data, the apparatus comprising: at least one memory; and at least one processor coupled to the at least one memory, the at least one processor configured to: obtain video data comprising a temporal series of a plurality of images, the video data including at least a right-view image of a right view of a scene and a left-view image of a left view of the scene; and compress the right-view image and the left-view image in parallel to generate a latent representation of the right-view image and the left-view image, wherein the right-view image and the left-view image are compressed in parallel based on inter-view information between the right-view image and the left-view image determined using one or more parallel autoencoders.

Aspect 2. The apparatus of Aspect 1, wherein, to compress the right-view image and the left-view image in parallel, the at least one processor is configured to: compress the right-view image based on features representing the right-view image and inter-view information corresponding to a correlation between the features of the right-view image and features of the left-view image.

Aspect 3. The apparatus of any of Aspects 1 to 2, wherein, to compress the right-view image and the left-view image in parallel, the at least one processor is configured to: compress the left-view image based on features representing the left-view image and inter-view information corresponding to a correlation between the features of the left-view image and features of the right-view image.

Aspect 4. The apparatus of Aspect 3, wherein the at least one processor is configured to: bidirectionally shift the features of the left-view image to generate shifted left-view image features; bidirectionally shift the features of the right-view image to generate shifted right-view image features; and determine the inter-view information corresponding to the correlation based on one or more correlations determined between the shifted right-view image features and the shifted left-view image features.

Aspect 5. The apparatus of any of Aspects 1 to 4, wherein, to compress the right-view image and the left-view image in parallel to generate the latent representation, the at least one processor is configured to: generate, using a first encoder of a parallel motion autoencoder, a first latent representation corresponding to motion information of the right-view image, wherein the first latent representation is generated based on features of the right-view image and inter-view features indicative of an estimated correlation between the right-view image and the left-view image; and generate, using a second encoder of the parallel motion autoencoder, a second latent representation corresponding to motion information of the left-view image, wherein the second latent representation is generated based on features of the left-view image and the inter-view features.

Aspect 6. The apparatus of Aspect 5, wherein the inter-view features are indicative of an estimated correlation between shifted features of the right-view image and shifted features of the left-view image.

Aspect 7. The apparatus of Aspect 6, wherein the estimated correlation includes groupwise correlation features determined between the shifted features of the right-view image and the shifted features of the left-view image.

Aspect 8. The apparatus of any of Aspects 6 to 7, wherein the estimated correlation includes concatenation-based correlation features determined between the shifted features of the right-view image and the shifted features of the left-view image.

Aspect 9. The apparatus of any of Aspects 5 to 8, wherein, to compress the right-view image and the left-view image in parallel to generate the latent representation, the at least one processor is further configured to: generate, using a first encoder of a parallel context autoencoder, a third latent representation corresponding to context information of the right-view image, wherein the third latent representation is generated based on warped right-view features of the right-view image and inter-view features indicative of an esti-mated correlation between the warped right-view fea-tures and warped left-view features corresponding to the left-view image; and generate, using a second encoder of the parallel context autoencoder, a fourth latent representation corresponding to context informa-tion of the left-view image, wherein the fourth latent representation is generated based on the warped left-view features and the inter-view features indicative of the estimated correlation between the warped right-view features and the warped left-view features.

Aspect 10. The apparatus of Aspect 9, wherein: the context information of the right-view image corre-sponds to a motion estimation residual associated with the right-view image, wherein the motion estimation residual associated with the right-view image is based on a concatenation of the warped right-view features and the features of the right-view image; and the context information of the left-view image corresponds to a motion estimation residual associated with the left-view image, wherein the motion estimation residual associated with the left-view image is based on a concatenation of the warped left-view features and the features of the left-view image.

Aspect 11. A method for encoding video data, the method comprising: obtaining video data comprising a tempo-ral series of a plurality of images, the video data including at least a right-view image of a right view of a scene and a left-view image of a left view of the scene; and compressing the right-view image and the left-view image in parallel to generate a latent repre-sentation of the right-view image and the left-view image, wherein the right-view image and the left-view image are compressed in parallel based on inter-view information between the right-view image and the left-view image determined using one or more parallel autoencoders.

Aspect 12. The method of Aspect 11, wherein compress-ing the right-view image and the left-view image in parallel comprises compressing the right-view image based on features representing the right-view image and inter-view information corresponding to a correla-tion between the features of the right-view image and features of the left-view image.

Aspect 13. The method of any of Aspects 11 to 12, wherein compressing the right-view image and the left-view image in parallel comprises compressing the left-view image based on features representing the left-view image and inter-view information corre-sponding to a correlation between the features of the left-view image and features of the right-view image.

Aspect 14. The method of Aspect 13, further comprising: bidirectionally shifting the features of the left-view image to generate shifted left-view image features; bidirectionally shifting the features of the right-view image to generate shifted right-view image features; and determining the inter-view information corre-sponding to the correlation based on one or more correlations determined between the shifted right-view image features and the shifted left-view image features.

Aspect 15. The method of any of Aspects 11 to 14, wherein compressing the right-view image and the left-view image in parallel to generate the latent rep-resentation comprises: generating, using a first encoder of a parallel motion autoencoder, a first latent repre-sentation corresponding to motion information of the right-view image, wherein the first latent representation is generated based on features of the right-view image and inter-view features indicative of an estimated cor-relation between the right-view image and the left-view image; and generating, using a second encoder of the parallel motion autoencoder, a second latent represen-tation corresponding to motion information of the left-view image, wherein the second latent representation is generated based on features of the left-view image and the inter-view features.

Aspect 16. The method of Aspect 15, wherein the inter-view features are indicative of an estimated correlation between shifted features of the right-view image and shifted features of the left-view image.

Aspect 17. The method of Aspect 16, wherein the esti-mated correlation includes groupwise correlation fea-tures determined between the shifted features of the right-view image and the shifted features of the left-view image.

Aspect 18. The method of any of Aspects 16 to 17, wherein the estimated correlation includes concatena-tion-based correlation features determined between the shifted features of the right-view image and the shifted features of the left-view image.

Aspect 19. The method of any of Aspects 15 to 18, wherein compressing the right-view image and the left-view image in parallel to generate the latent rep-resentation comprises: generating, using a first encoder of a parallel context autoencoder, a third latent repre-sentation corresponding to context information of the right-view image, wherein the third latent representa-tion is generated based on warped right-view features of the right-view image and inter-view features indica-tive of an estimated correlation between the warped right-view features and warped left-view features cor-responding to the left-view image; and generating, using a second encoder of the parallel context autoen-coder, a fourth latent representation corresponding to context information of the left-view image, wherein the fourth latent representation is generated based on the warped left-view features and the inter-view features indicative of the estimated correlation between the warped right-view features and the warped left-view features.

Aspect 20. The method of Aspect 19, wherein: the context information of the right-view image corresponds to a motion estimation residual associated with the right-view image, wherein the motion estimation residual associated with the right-view image is based on a concatenation of the warped right-view features and the features of the right-view image; and the context infor-mation of the left-view image corresponds to a motion estimation residual associated with the left-view image, wherein the motion estimation residual associated with the left-view image is based on a concatenation of the warped left-view features and the features of the left-view image Aspect 21. An apparatus for decoding video data, the apparatus comprising: at least one memory; and at least one processor coupled to the at least one memory, the at least one processor configured to: obtain a first reconstructed right-view image of a right view of a scene at a first time step and a first reconstructed left-view image of a left view of the scene at the first time step; obtain encoded motion information associated with a compressed right-view image and a compressed left-view image; decode the encoded motion information to generate reconstructed motion information; and warp, using the reconstructed motion information, the first reconstructed right-view image and the first reconstructed left-view image to generate a second reconstructed right-view image of a right view of the scene at a second time step and a second reconstructed left-view image of a left view of the scene at the second time step.

Aspect 22. The apparatus of Aspect 21, wherein, to obtain the encoded motion information, the at least one processor is configured to: obtain, from one or more encoders of a parallel motion autoencoder, a latent representation associated with the compressed right-view image and the compressed left-view image; and decode, using one or more decoders corresponding to the one or more encoders of the parallel motion auto-encoder, the latent representation associated with the compressed right-view image and the compressed left-view image.

Aspect 23. The apparatus of any of Aspects 21 to 22, wherein the at least one processor is configured to: decode a portion of the encoded motion information associated with the compressed right-view image in parallel with a portion of the encoded motion information associated with the compressed left-view image; and generate reconstructed motion information corresponding to the compressed right-view image in parallel with reconstructed motion information corresponding to the compressed left-view image.

Aspect 24. The apparatus of any of Aspects 21 to 23, wherein the at least one processor is configured to generate the second reconstructed right-view image of the right view of the scene at the second time step in parallel with the second reconstructed left-view image of the left view of the scene at the second time step.

Aspect 25. The apparatus of Aspect 24, wherein the at least one processor is configured to: warp the first reconstructed right-view image with a portion of the reconstructed motion information corresponding to the compressed right-view image, using a parallel autoencoder configured to determine inter-view information between a right-view image processing branch and a left-view image processing branch of the apparatus.

Aspect 26. The apparatus of Aspect 25, wherein the at least one processor is configured to: warp the first reconstructed left-view image with a portion of the reconstructed motion information corresponding to the compressed left-view image, using the parallel autoencoder and the inter-view information between the right-view image processing branch and the left-view image processing branch of the apparatus.

Aspect 27. The apparatus of any of Aspects 25 to 26, wherein: the right-view image processing branch corresponds to the first reconstructed right-view image, the compressed right-view image, and the second reconstructed right-view image; and the left-view image processing branch corresponds to the first reconstructed left-view image, the compressed left-view image, and the second reconstructed left-view image.

Aspect 28. The apparatus of any of Aspects 25 to 27, wherein the inter-view information corresponds to one or more correlations determined between right-view features associated with the right-view image processing branch and left-view features associated with the left-view image processing branch.

Aspect 29. The apparatus of Aspect 28, wherein the at least one processor is configured to: bidirectionally shift the right-view features to generate shifted right-view features; bidirectionally shift the left-view features to generate shifted left-view features; and determine the inter-view information corresponding to the one or more correlations based on one or more correlations determined between the shifted right-view features and the shifted left-view features.

Aspect 30. A method for decoding video data, the method comprising: obtaining a first reconstructed right-view image of a right view of a scene at a first time step and a first reconstructed left-view image of a left view of the scene at the first time step; obtaining encoded motion information associated with a compressed right-view image and a compressed left-view image; decoding the encoded motion information to generate reconstructed motion information; and warping, using the reconstructed motion information, the first reconstructed right-view image and the first reconstructed left-view image to generate a second reconstructed right-view image of a right view of the scene at a second time step and a second reconstructed left-view image of a left view of the scene at the second time step.

Aspect 31. The method of Aspect 30, wherein obtaining the encoded motion information comprises: obtaining, from one or more encoders of a parallel motion auto-encoder, a latent representation associated with the compressed right-view image and the compressed left-view image; and decoding, using one or more decoders corresponding to the one or more encoders of the parallel motion autoencoder, the latent representation associated with the compressed right-view image and the compressed left-view image.

Aspect 32. The method of any of Aspects 30 to 31, further comprising: decoding a portion of the encoded motion information associated with the compressed right-view image in parallel with a portion of the encoded motion information associated with the compressed left-view image; and generating reconstructed motion information corresponding to the compressed right-view image in parallel with reconstructed motion information corresponding to the compressed left-view image.

Aspect 33. The method of any of Aspects 30 to 32, further comprising generating the second reconstructed right-view image of the right view of the scene at the second time step in parallel with the second reconstructed left-view image of the left view of the scene at the second time step.

Aspect 34. The method of Aspect 33, further comprising warping the first reconstructed right-view image with a portion of the reconstructed motion information corresponding to the compressed right-view image, using a parallel autoencoder configured to determine interview information between a right-view image processing branch and a left-view image processing branch of the apparatus.

Aspect 35. The method of Aspect 34, further comprising warping the first reconstructed left-view image with a portion of the reconstructed motion information corresponding to the compressed left-view image, using the parallel autoencoder and the inter-view information between the right-view image processing branch and the left-view image processing branch of the apparatus.

Aspect 36. The method of any of Aspects 34 to 35, wherein: the right-view image processing branch corresponds to the first reconstructed right-view image, the compressed right-view image, and the second reconstructed right-view image; and the left-view image processing branch corresponds to the first reconstructed left-view image, the compressed left-view image, and the second reconstructed left-view image.

Aspect 37. The method of any of Aspects 34 to 36, wherein the inter-view information corresponds to one or more correlations determined between right-view features associated with the right-view image processing branch and left-view features associated with the left-view image processing branch.

Aspect 38. The method of Aspect 37, further comprising: bidirectionally shifting the right-view features to generate shifted right-view features; bidirectionally shifting the left-view features to generate shifted left-view features; and determining the inter-view information corresponding to the one or more correlations based on one or more correlations determined between the shifted right-view features and the shifted left-view features.

Aspect 39. A non-transitory computer-readable storage medium comprising instructions stored thereon which, when executed by at least one processor, causes the at least one processor to perform operations according to any of Aspects 1 to 20.

Aspect 40. A non-transitory computer-readable storage medium comprising instructions stored thereon which, when executed by at least one processor, causes the at least one processor to perform operations according to any of Aspects 21 to 38.

Aspect 41. An apparatus comprising one or more means for performing operations according to any of Aspects 1 to 20.

Aspect 42. An apparatus comprising one or more means for performing operations according to any of Aspects 21 to 38.

Aspect 43. An apparatus for encoding video data, the apparatus comprising: at least one memory; and at least one processor coupled to the at least one memory, the at least one processor configured to: obtain video data including at least a right-view image of a right view of a scene and a left-view image of a left view of the scene; and compress the right-view image and the left-view image in parallel to generate a latent representation of the right-view image and the left-view image.

Aspect 44. The apparatus of Aspect 43, wherein the at least one processor is configured to: extract features representing the right-view image and the left-view image.

Aspect 45. The apparatus of Aspect 44, wherein the at least one processor is configured to: perform, using the extracted features, motion estimation to estimate motion information for the right-view image and the left-view image.

Aspect 46. The apparatus of Aspect 45, wherein the at least one processor is configured to: quantize and entropy encode the motion information.

Aspect 47. The apparatus of Aspect 46, wherein the at least one processor is configured to: generate a bitstream including the quantized and entropy encoded motion information.

Aspect 48. A method of encoding video data, the method comprising operations according to any of Aspects 43 to 47.

Aspect 49: A computer-readable storage medium storing instructions that, when executed, cause one or more processors to perform any of the operations of Aspects 43 to 47.

Aspect 50: An apparatus comprising means for performing any of the operations of Aspects 43 to 47.

Aspect 51. An apparatus for decoding video data, the apparatus comprising: at least one memory; and at least one processor coupled to the at least one memory, the at least one processor configured to: obtain a first reconstructed right-view image of a right view of a scene at a first time step and a first reconstructed left-view image of a left view of the scene at the first time step; obtain encoded motion information associated with a compressed right-view image and the compressed left-view image; decode the encoded motion information to generate reconstructed motion information; warping, using the reconstructed motion information, the first reconstructed right-view image and the first reconstructed left-view image to generate a second reconstructed right-view image of a right view of a scene at a second time step and a second reconstructed left-view image of a left view of the scene at the second time step.

Aspect 52. A method of decoding video data, the method comprising: obtaining a first reconstructed right-view image of a right view of a scene at a first time step and a first reconstructed left-view image of a left view of the scene at the first time step; obtaining encoded motion information associated with a compressed right-view image and the compressed left-view image; decoding the encoded motion information to generate reconstructed motion information; warping, using the reconstructed motion information, the first reconstructed right-view image and the first reconstructed left-view image to generate a second reconstructed right-view image of a right view of a scene at a second time step and a second reconstructed left-view image of a left view of the scene at the second time step.

Aspect 53: A computer-readable storage medium storing instructions that, when executed, cause one or more processors to: obtain a first reconstructed right-view image of a right view of a scene at a first time step and a first reconstructed left-view image of a left view of the scene at the first time step; obtain encoded motion information associated with a compressed right-view image and the compressed left-view image; decode the encoded motion information to generate reconstructed motion information; warping, using the reconstructed motion information, the first reconstructed right-view image and the first reconstructed left-view image to generate a second reconstructed right-view image of a right view of a scene at a second time step and a second reconstructed left-view image of a left view of the scene at the second time step.

Aspect 54: An apparatus comprising: means for obtaining a first reconstructed right-view image of a right view of a scene at a first time step and a first reconstructed left-view image of a left view of the scene at the first time step; means for obtaining encoded motion information associated with a compressed right-view image and the compressed left-view image; means for decoding the encoded motion information to generate reconstructed motion information; and means for warping, using the reconstructed motion information, the first reconstructed right-view image and the first reconstructed left-view image to generate a second reconstructed right-view image of a right view of a scene at a second time step and a second reconstructed left-view image of a left view of the scene at the second time step.

What is claimed is:

1. An apparatus for encoding video data, the apparatus comprising:

at least one memory; and at least one processor coupled to the at least one memory, the at least one processor configured to:

obtain video data comprising a temporal series of a plurality of images, the video data including at least a right-view image of a right view of a scene and a left-view image of a left view of the scene; and compress the right-view image and the left-view image in parallel to generate a latent representation of the right-view image and the left-view image, wherein the right-view image and the left-view image are compressed in parallel based on inter-view information between the right-view image and the left-view image determined using one or more parallel autoencoders.

2. The apparatus of claim 1, wherein, to compress the right-view image and the left-view image in parallel, the at least one processor is configured to:

compress the right-view image based on features representing the right-view image and inter-view information corresponding to a correlation between the features of the right-view image and features of the left-view image.

3. The apparatus of claim 1, wherein, to compress the right-view image and the left-view image in parallel, the at least one processor is configured to:

compress the left-view image based on features representing the left-view image and inter-view information corresponding to a correlation between the features of the left-view image and features of the right-view image.

4. The apparatus of claim 3, wherein the at least one processor is configured to:

bidirectionally shift the features of the left-view image to generate shifted left-view image features;

bidirectionally shift the features of the right-view image to generate shifted right-view image features; and determine the inter-view information corresponding to the correlation based on one or more correlations determined between the shifted right-view image features and the shifted left-view image features.

5. The apparatus of claim 1, wherein, to compress the right-view image and the left-view image in parallel to generate the latent representation, the at least one processor is configured to:

generate, using a first encoder of a parallel motion autoencoder, a first latent representation corresponding to motion information of the right-view image, wherein the first latent representation is generated based on features of the right-view image and inter-view features indicative of an estimated correlation between the right-view image and the left-view image; and generate, using a second encoder of the parallel motion autoencoder, a second latent representation corresponding to motion information of the left-view image, wherein the second latent representation is generated based on features of the left-view image and the inter-view features.

6. The apparatus of claim 5, wherein the inter-view features are indicative of an estimated correlation between shifted features of the right-view image and shifted features of the left-view image.

7. The apparatus of claim 6, wherein the estimated correlation includes groupwise correlation features determined between the shifted features of the right-view image and the shifted features of the left-view image.

8. The apparatus of claim 6, wherein the estimated correlation includes concatenation-based correlation features determined between the shifted features of the right-view image and the shifted features of the left-view image.

9. The apparatus of claim 5, wherein, to compress the right-view image and the left-view image in parallel to generate the latent representation, the at least one processor is further configured to:

generate, using a first encoder of a parallel context autoencoder, a third latent representation corresponding to context information of the right-view image, wherein the third latent representation is generated based on warped right-view features of the right-view image and inter-view features indicative of an estimated correlation between the warped right-view features and warped left-view features corresponding to the left-view image; and generate, using a second encoder of the parallel context autoencoder, a fourth latent representation corresponding to context information of the left-view image, wherein the fourth latent representation is generated based on the warped left-view features and the inter-view features indicative of the estimated correlation between the warped right-view features and the warped left-view features.

10. The apparatus of claim 9, wherein:

the context information of the right-view image corresponds to a motion estimation residual associated with the right-view image, wherein the motion estimation residual associated with the right-view image is based on a concatenation of the warped right-view features and the features of the right-view image; and the context information of the left-view image corresponds to a motion estimation residual associated with the left-view image, wherein the motion estimation residual associated with the left-view image is based on a concatenation of the warped left-view features and the features of the left-view image.

11. A method for encoding video data, the method comprising:

obtaining video data comprising a temporal series of a plurality of images, the video data including at least a right-view image of a right view of a scene and a left-view image of a left view of the scene; and compressing the right-view image and the left-view image in parallel to generate a latent representation of the right-view image and the left-view image, wherein the right-view image and the left-view image are compressed in parallel based on inter-view information between the right-view image and the left-view image determined using one or more parallel autoencoders.

12. An apparatus for decoding video data, the apparatus comprising:

at least one memory; and at least one processor coupled to the at least one memory, the at least one processor configured to:

obtain a first reconstructed right-view image of a right view of a scene at a first time step and a first reconstructed left-view image of a left view of the scene at the first time step;

obtain encoded motion information associated with a compressed right-view image and a compressed left-view image;

decode the encoded motion information to generate reconstructed motion information; and warp, using the reconstructed motion information, the first reconstructed right-view image and the first reconstructed left-view image to generate a second reconstructed right-view image of a right view of the scene at a second time step and a second reconstructed left-view image of a left view of the scene at the second time step.

13. The apparatus of claim 12, wherein, to obtain the encoded motion information, the at least one processor is configured to:

obtain, from one or more encoders of a parallel motion autoencoder, a latent representation associated with the compressed right-view image and the compressed left-view image; and decode, using one or more decoders corresponding to the one or more encoders of the parallel motion autoencoder, the latent representation associated with the compressed right-view image and the compressed left-view image.

14. The apparatus of claim 12, wherein the at least one processor is configured to:

decode a portion of the encoded motion information associated with the compressed right-view image in parallel with a portion of the encoded motion information associated with the compressed left-view image; and generate reconstructed motion information corresponding to the compressed right-view image in parallel with reconstructed motion information corresponding to the compressed left-view image.

15. The apparatus of claim 12, wherein the at least one processor is configured to generate the second reconstructed right-view image of the right view of the scene at the second time step in parallel with the second reconstructed left-view image of the left view of the scene at the second time step.

16. The apparatus of claim 15, wherein the at least one processor is configured to:

warp the first reconstructed right-view image with a portion of the reconstructed motion information corresponding to the compressed right-view image, using a parallel autoencoder configured to determine inter-view information between a right-view image processing branch and a left-view image processing branch of the apparatus.

17. The apparatus of claim 16, wherein the at least one processor is configured to:

warp the first reconstructed left-view image with a portion of the reconstructed motion information corresponding to the compressed left-view image, using the parallel autoencoder and the inter-view information between the right-view image processing branch and the left-view image processing branch of the apparatus.

18. The apparatus of claim 16, wherein:

the right-view image processing branch corresponds to the first reconstructed right-view image, the compressed right-view image, and the second reconstructed right-view image; and the left-view image processing branch corresponds to the first reconstructed left-view image, the compressed left-view image, and the second reconstructed left-view image.

19. The apparatus of claim 16, wherein the inter-view information corresponds to one or more correlations determined between right-view features associated with the right-view image processing branch and left-view features associated with the left-view image processing branch.

20. The apparatus of claim 19, wherein the at least one processor is configured to:

bidirectionally shift the right-view features to generate shifted right-view features;

bidirectionally shift the left-view features to generate shifted left-view features; and determine the inter-view information corresponding to the one or more correlations based on one or more correlations determined between the shifted right-view features and the shifted left-view features.

* * * * *